United States Patent [19]

Jolidon et al.

[11] Patent Number: 4,774,512

[45] Date of Patent: Sep. 27, 1988

[54] ARRANGEMENT FOR REMOVING A CONDITIONAL BAN ON THE OPERATION OF A LOCK

[75] Inventors: Francois Jolidon, La Chaux-de-Fonds; Willy Richard, Renan, both of Switzerland

[73] Assignee: Relhor S.A., La Chaux-de-Fonds, Switzerland

[21] Appl. No.: 127,514

[22] Filed: Nov. 30, 1987

Related U.S. Application Data

[63] Continuation of Ser. No. 838,867, Mar. 12, 1986, abandoned.

[30] Foreign Application Priority Data

Mar. 29, 1985 [CH] Switzerland ........................ 1375/85

[51] Int. Cl.[4] .......................... E05B 49/00; H04Q 9/00

[52] U.S. Cl. ................................ 340/825.310; 70/272; 70/284; 361/172; 340/825.560

[58] Field of Search ...................... 340/825.31, 825.32, 340/825.56, 825.06; 361/172; 70/267-275, 284, 277, 278, 287, 288

[56] References Cited

U.S. PATENT DOCUMENTS

| | | | |
|---|---|---|---|
| 3,881,171 | 4/1975 | Moorman et al. | 340/825.32 |
| 4,218,690 | 8/1980 | Ulch et al. | 340/825.31 |
| 4,293,915 | 10/1981 | Carpenter et al. . | |
| 4,472,789 | 9/1984 | Sibley . | |
| 4,567,557 | 1/1986 | Burns | 340/825.06 |
| 4,634,846 | 1/1987 | Harvey et al. | 340/825.31 |
| 4,644,484 | 2/1987 | Flynn et al. | 340/825.31 |

FOREIGN PATENT DOCUMENTS

| | | | |
|---|---|---|---|
| 0102346 | 3/1984 | European Pat. Off. . | |
| 2218956 | 7/1973 | Fed. Rep. of Germany | 70/267 |

OTHER PUBLICATIONS

Flektor, vol. 9, No. 4, Apr. 1983, pp. 4.42-4.50, Canterbury, Kent, GB; "7-Day Timer/Controller".

*Primary Examiner*—Donald J. Yusko
*Attorney, Agent, or Firm*—Sughrue, Mion, Zinn, Macpeak & Seas

[57] ABSTRACT

In this arrangement the lock may be operated only if a bolt is withdrawn. Such bolt is driven by a motor controlled by a micro-processor associated with a memory in which time slots for removal of the ban on lock operation are stored. These time slots are constantly compared with the time of day by the micro-processor which removes the ban by controlling the motor only if the time of day is within a time slot. Blocking intervals having precedence over the time slots may intervene so as to prevent removal of the ban during such intervals. A keyboard following checking of an authorizing code permits eventual modification of the time slots and the blocking intervals. The arrangement finds use for safes and other protected enclosures.

12 Claims, 22 Drawing Sheets

ARRANGEMENT FOR REMOVING A CONDITIONAL BAN ON THE OPERATION OF A LOCK

This is a continuation of application Ser. No. 838,867, filed Mar. 12, 1986, now abandoned.

This invention relates to the domain of the protection of secured enclosures and in particular concerns an arrangement for removing a conditional ban on the operation of a lock, particularly for a safe, strong box or other protected enclosure.

BACKGROUND OF THE INVENTION

At present, time slots are frequently employed to condition the possibility of opening a protected enclosure in order to avoid as far as possible criminal violation of the protection and exposure to serious risks of the operating personnel.

Thus, blocking means have already been associated with locks which prevent operation during certain periods of the day, even for people who either possess the key to the lock or possess the code for the opening thereof if controlled in a more complex manner. If in this manner the periods of removal of the ban are reduced to a minimum, the risks of violation are evidently less.

The main problem which such an installation poses is that of determining the time slots corresponding to the removal of the ban which is arranged preferably in an automatic manner so that the personnel who must daily serve the protected enclosure are unable to modify the data relating to the slots, at least in the sense of enlarging the latter. This impossibility for the personnel to open the protected enclosure constitutes for them additional security since an attack, occurring outside the time slots when the ban is removed, may thus be thwarted by the impossibility inherent in the system of being able to be opened. Even the order to open the protected enclosure under the threat of arms cannot lead to the opening thereof since the personnel having available the key or the code for the opening is unable to bring about such opening.

It is furthermore desirable that the time slots may be modified as a function of circumstances such as the changing of the opening hours of the teller cages of a bank, the inauguration of night sales in a department store or, for another establishment, the period of closing by reason of holidays for example. Such an adaptation must naturally be realized by authorized persons who may or may not be those belonging to the personnel habitually employing the protected enclosure.

It is to this problem of creating a system of the type hereinabove indicated that the invention advances a solution in providing an easily adaptable arrangement for the removal of a ban of convenient operation and of great flexibility as to its possibilities of installation on protected enclosures of every type.

SUMMARY OF THE INVENTION

The invention thus provides an arrangement for removing a conditional ban on the operation of a lock in particular for a safe, strong box or other protected enclosure comprising electro-mechanical blocking means which under control of an electronic circuit are adapted to place or remove the ban on the operation of said lock, said electronic control circuit including a memory in which is stored a time schedule program to be cyclically executed and defining at least one time slot of ban removal, means associated with said memory arranged to compare periodically the time of day with the moments framing said time slot and means controlling the blocking means thereby to block or release said lock when there is equality between the time of day and said moments.

Thanks to such characteristics, the removals of the ban on operation of the lock are determined as a function of the time of day in a manner such that the time slots which surround the removals of the ban may be established easily by introducing into the arrangement an opening hour and a closing hour.

DESCRIPTION OF THE PREFERRED EMBODIMENT

In the description to follow, the invention is explained by means of an example concerning specifically a safe. However, this example is not intended to be limiting since the invention can be applied on each occasion when it is required to assure the conditional control of a lock for the protection of an enclosure capable of being blocked by a locking element.

Figure 2:
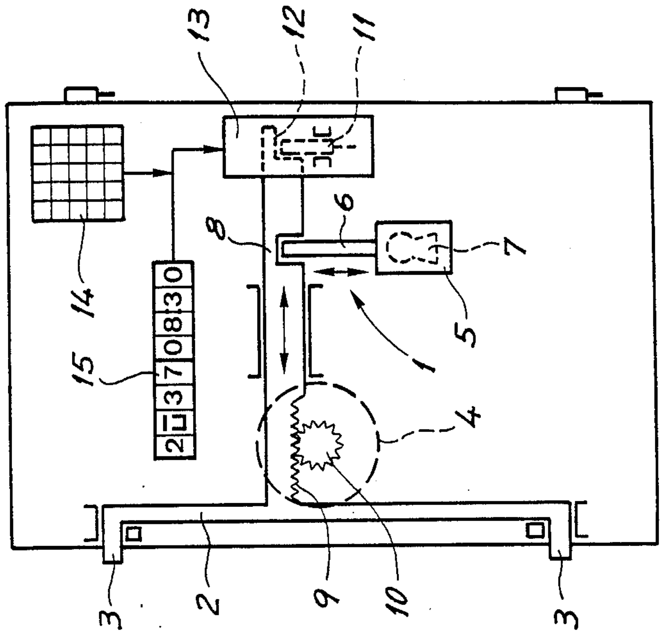
FIG. 2 is a view likewise schematic of the interior surface of the door of the safe.
Figure 1:
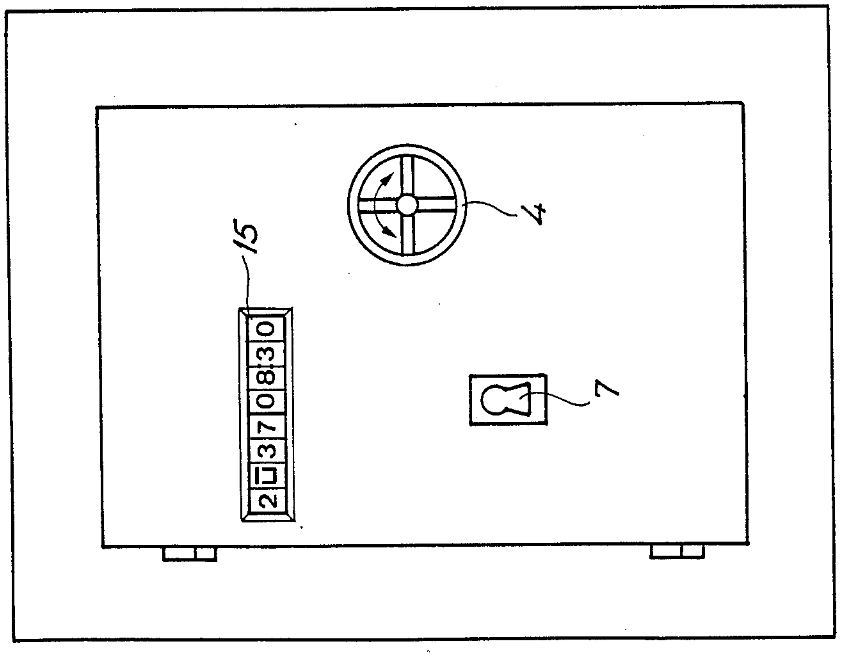
FIG. 1 shows schematically the front face of a safe including the assembly of the lock according to the invention.

FIGS. 1 and 2 show respectively the front face of a safe and the interior surface of the door of this latter. The assembly of the lock of this safe being of a well-known type, it is not necessary to give here a detailed description or a complete representation thereof. It is sufficient to note that this assembly of lock 1 comprises a rod linkage 2 provided with latch bolts 3 and capable of being displaced from a latching position to an unlatching position and inversely by means of a control wheel 4. A lock, the casing of which is shown at 5 and the bolt of which is shown at 6, may be operated by means of a standard key through a keyhole 7 and such lock, as may well be understood, may be as complex as one would wish in the context of the security to be assured having regard to the contents of the safe.

The bolt 6 cooperates with a bar 8 of the rod assembly 2, this bar being here mounted to slide in a horizontal sense and comprising a rack 9 with which cooperates a pinion 10 mounted on the control wheel 4.

It is clear that operation of the rod assembly 2 by means of control wheel 4 is prevented when the lock is closed (bolt 6 in its upper position as shown).

The arrangement according to the invention enables opposing the operation of this rod assembly 2 by a second locking element 11 the control of which determines the conditional removal of the ban on opening the lock of the safe. Effectively, although such is not shown except summarily in FIG. 2, it will be seen that the locking element 11 may be vertically displaced and thus prevent the sliding in the sense of opening of the rod assembly 2 by penetrating into a cut-out 12 which is found at the rear of bar 8. As will be explained further on, the second locking element 11 is motorized and controlled by an electronic circuit 13 to which will be coupled on one hand a control keyboard 14 and on the other hand a display arrangement 15, the keyboard being found on the inside of the door while the display element comprises two display fields appearing respectively on either side of said door.

Figure 3:
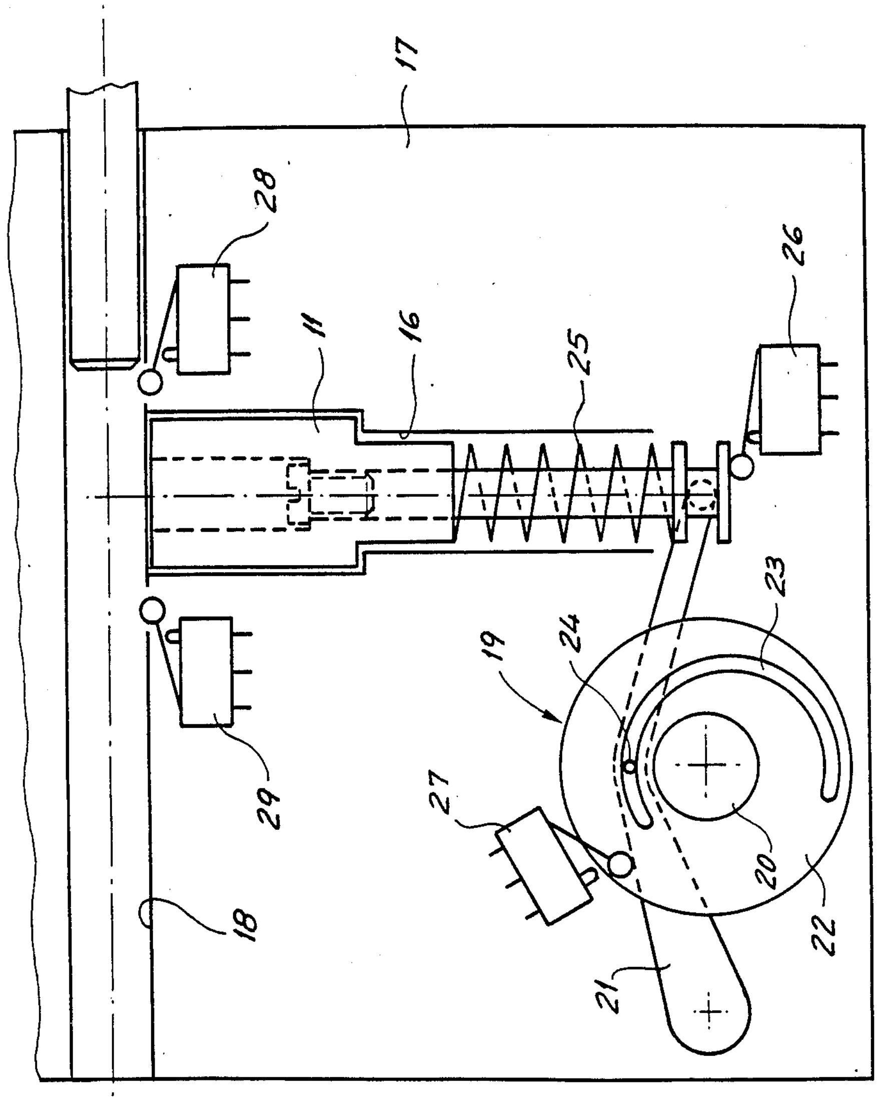
FIG. 3 is a more detailed schematic representation of the arrangement for blocking the lock.

Referring now to FIG. 3, there will be described—likewise summarily—a possible arrangement of the mechanical part of the blocking arrangement for the lock according to the invention, the details of such realization being readily apparent to persons skilled in the art from the description which will follow such representation.

The blocking element 11 is obtained in the form of a sliding block mounted to be axially movable in a guide 16 of a support 17 arranged on the door of the safe. This latter likewise provides a channel 18 in which may slide bar 8 of the rod assembly 2 and into which opens the guide 16 in a manner such that the sliding block 11 when emerging from guide 16 to intersect channel 18 may be opposed to the back movement of the bar 8.

This motion is controlled by a motor assembly 19 comprising a motor 20, a lever 21 mounted on the support 17 and a cam 22 mounted on the shaft of the motor 20 and provided with an excentric guide groove 23 in the form of an arc of a circle. In this groove there may slide a pin 24 fixed to lever 21. Lever 21 is attached at its free extremity to the lower end of sliding block 11 and since pin 24 is situated midway along lever 21 it is seen that if the motor 20 is operated in one sense the lever may lift the sliding block 11 when the pin is displaced in the cam guide slot 23 and that the inverse movement brings about lowering of this sliding block. It is to be noted that, when bar 8 is found in a position in which it blocks guide 16, the sliding block 11 may be urged towards its blocking position thanks to the presence of a spring 25 which is mounted about the lower portion of the sliding block 11 and which is compressed when the motor is driven in the sense of raising sliding block 11. Consequently, when under these conditions the bar 8 returns to its closing position (towards the right on the figure) the sliding block 11 is immediately moved across channel 18 so as to oppose further movement in the opening sense of bar 8.

The assembly which has just been described comprises further four switches 26 to 29 which have the following functions:

switch 26: this is placed below guide 16 to sense that sliding block 11 is in its lower position;

switch 27: this cooperates with lever 21 to furnish a signal when lever 21 is in its upper position; consequently, when switch 26 is closed the sliding block is down and when switch 27 is closed, the sliding block is up;

switch 28: this senses an "attempt to open", i.e. it is operated by the rear extremity of the bar 8 and shows that the control wheel 4 has been displaced in the opening sense, when the sliding block 11 is still in its upper position;

switch 29: this senses that bar 8 is effectively in its rear position (safe open).

Figure 4:
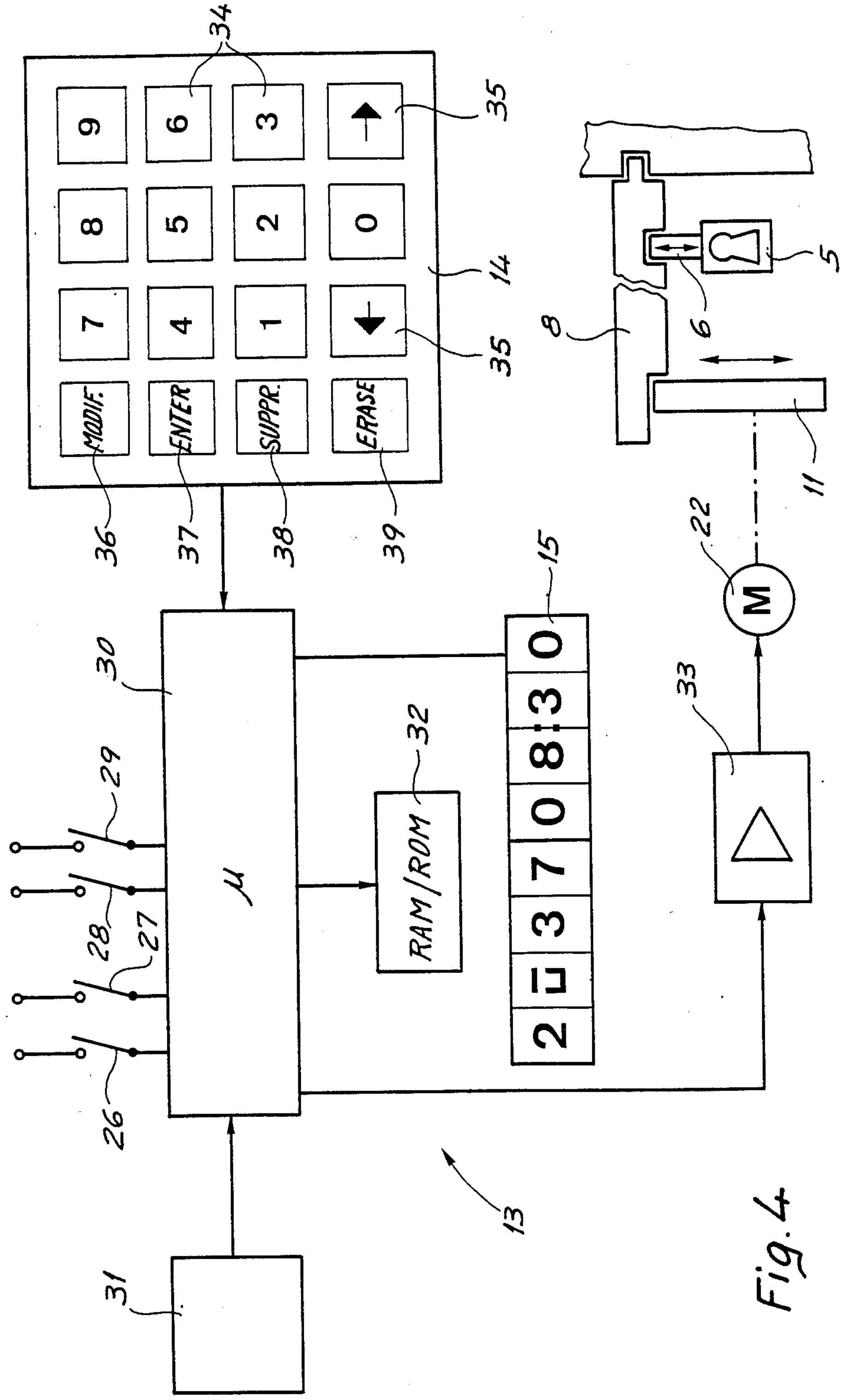
FIG. 4 is a simplified schematic of the electronic control circuit of the lock in accordance with the invention.

FIG. 4 shows a simplified schematic of the electronic circuit employed with the mechanical arrangement which has just been described. There will be recognized on this figure bar 8, sliding block 11 driven by motor 22, keyboard 14 and display arrangement 15. This latter and keyboard 14 comprise the peripheral elements of a microprocessor 30 which is likewise connected to a time base circuit 31, to a memory 32 of the type RAM/ROM and to an amplifying circuit 33 arranged to provide energy to the motor 22 when a control signal to this effect issues from the microprocessor 30.

Keyboard 14 comprises the usual digital keys 34, shift keys 35 to enable successive operations on data appearing in the openings in the display field towards the left and towards the right, a modifying key 36, a confirmation key 37, a suppression key 38 as well as a cancellation key 39. Keyboard 14 is intended to enable the introduction of program data into the electrical circuit according to procedures which may be effected either by the daily user of the safe or by an authorized person, such latter having to have available a secret code in principle unknown to the daily user. Such access procedures by a user code being known in the technique of micro-processors, it is not necessary to give a detailed description here.

The display arrangement 15 comprises eight display fields of which four fields situated to the right are intended to indicate the hour and of which the four fields to the left indicate respectively from right to left the day of the week (1 to 7) and the relative week (0 to 3), this latter concept being explained further on. The opening or closing of the safe (the condition of opening being shown here), and finally the indication of the momentary functional mode of the electronic circuit. It is to be noted that this display arrangement is of the interactive type and thus permits a dialogue between the keyboard operator and the display 15, particularly during modification of the programming of the arrangement in accordance with the invention.

Figure 5:
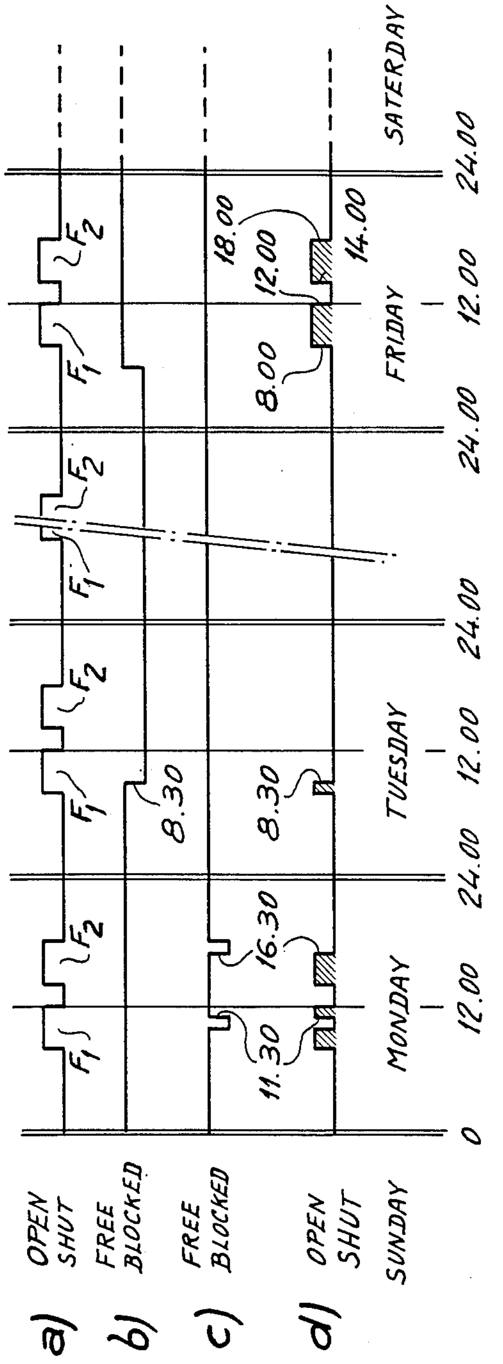
FIG. 5 is a diagram representing an example of a weekly program capable of determining the periods of removal of the ban on operation of the lock.

FIG. 5 shows a timing diagram illustrating an operating example which may be executed by the arrangement in accordance with the invention. Trace a of this diagram shows a weekly base program which is cyclic and which thus is repeated in principle every week. In the case shown, each day presents two time slots respectively between 10 and 12 o'clock and between two and six o'clock of the afternoon. This program is pre-established by an authorized person having available the secret access code which the daily user is unable to modify. It is to be noted that in the example which is to be described hereinafter, one may program each day up to four opening time slots. Thus, the program determines in advance the periods for removal of the ban on opening the lock.

However, this removal of the ban may be subject to certain further conditions which may be imposed either by the authorized person, or by the daily user and which are illustrated by traces b and c of FIG. 5. Examining initially trace b, it will be seen that the weekly base program of trace a may be inhibited for a duration extending from several hours to several weeks. In contrast to the base program, this inhibition is not cyclic, but must be programmed by the authorized person step by step and be automatically cancelled following its execution. The inhibition referred to as imposed (since the daily user may not cancel it) may be useful for instance to prevent opening during a vacation period, a leave of absence because of a holiday, etc. In the example as described, the inhibition may be given in "relative" weeks (which go from 0 to 3 in number), in days (from 1 to 7), in hours and in minutes between the moment of the beginning and the moment of the end of the inhibition. In the example of FIG. 5, it is supposed that the inhibition period as imposed begins on Tuesday at 8:30 and ends Friday at 6:00.

Trace c represents the chosen inhibition, i.e. selectable by the daily user who does not have available the secret access code. This inhibition may be useful when the user must be absent in the course of the day during one or several periods, which is the case in the example shown for Monday. Effectively, the ban on opening is established between 10:00 and 11:30 o'clock and from 16:30 to 18:00.

Trace d shows thus the effective opening periods or periods of removal of the ban which are hatched for greater clarity.

As is well understood, FIG. 5 represents only one example of programming of the removal of the ban and any other combination of periods of opening and closing could be chosen as a function of the requirements, either by the authorized programmer or by the daily user. Furthermore, at any time, if one is within the enclosure, immediate opening and closing may be required by both types of operators.

It is further to be noted that the programming of the moments of opening and closing or removal and imposition of the ban should not be confused with the programming of the microprocessor 30 the operation of which will now be described with reference to the flow charts of FIGS. 8*a* to 18*b*.

At this time, however, the contents of memory 32 ought to be initially examined, or at least the essential portion of this memory which contains at the same time the program data for the removal of the ban as described hereinbefore and the program controlling the operation of the microprocessor 30.

Figure 6:
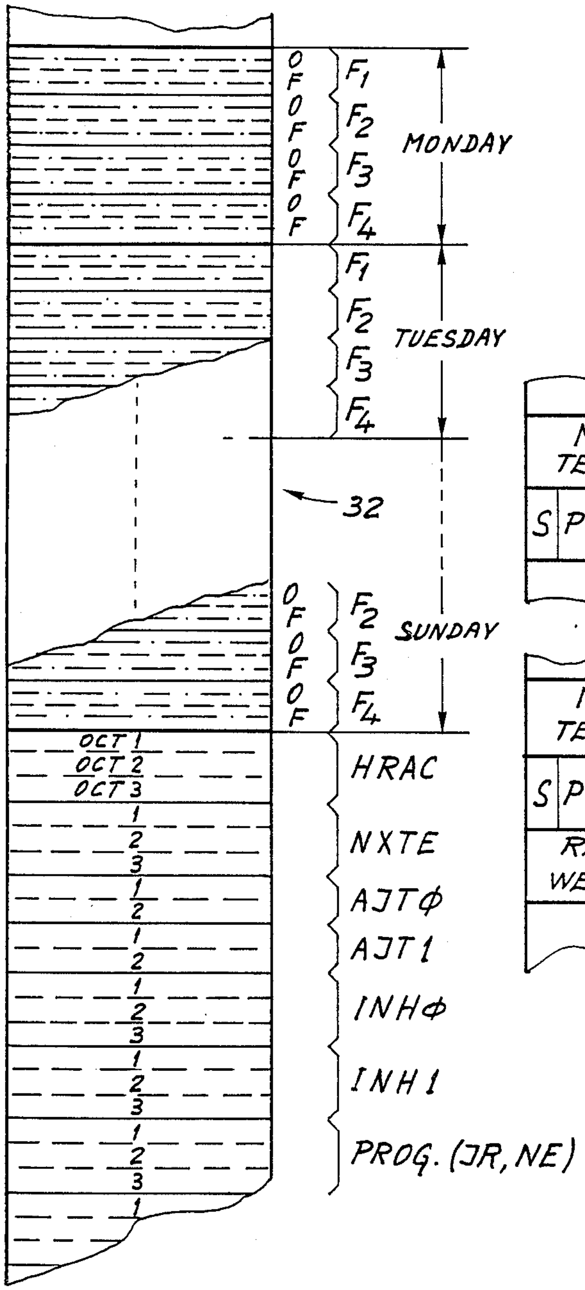
FIG. 6 is a schematic representation of the contents of the RAM memory employed in the electronic circuit.

FIG. 6 shows schematically the organization of the portion RAM of memory 32 in which is stored the data which is essential for operating the invention. The weekly program is assigned therein in 112 octets, at maximum in the example shown, this program being employed cyclically week after week. To each day may be assigned four time slots for removal of the ban, numbered $F_1$ to $F_4$, each slot requiring for its definition two octets for the opening and two octets for its closing.

Another field of the memory is intended to contain variable parameters of which certain occupy three octets and others require only two thereof.

Figure 7:
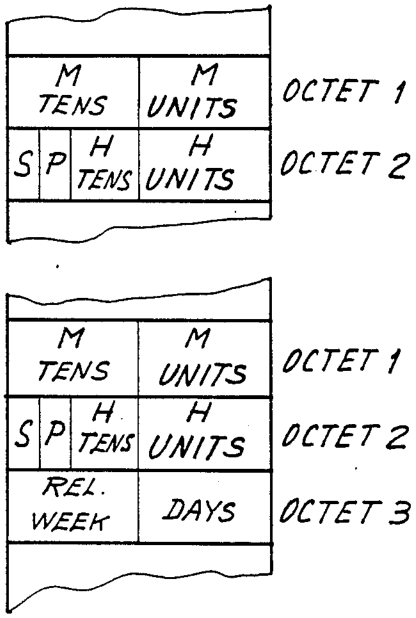
FIG. 7 shows the contents of several octets of the memory in order to define respectively "short" data and "long" data.

FIG. 7 shows two examples of groups of octets employed for this particular memory organization.

The upper portion of FIG. 7 represents the contents of two octets, hereinafter referred to as "short" data, used for defining an opening or a closing of a time slot $F_1$ to $F_4$, while the lower portion represents a group of three octets corresponding to "long" data.

The first octet of a short data item includes on four bits the minutes units (0 to 9), the four most significant bits being assigned to the tens of minutes (0 to 5). The second octet includes in its four least significant bits the hours units (0 to 9), the two following bits being assigned to the tens of hours (0 to 2), the remaining bits corresponding respectively to variables P and S adapted each to allow two states 0 and 1. The P bit, when it has the value 1, indicates that the short data item in question is programmed and when it is at zero, that this data item is not programmed. The S bit, when it is at 1, signifies that following processing of this data item the sliding block 11 (FIGS. 2 and 3) must be lowered to unblock passage of bar 8, while when this bit is at zero, the inverse movement must be set off.

A long data item comprises in its two first octets the same information as that employed to define a short data item, while the third octet of the long data item defines in its four least significant bits the week days (0 to 6) and in its four other bits "relative weeks" (0 to 3).

The concept "relative week" signifies the days which extend from today to today+6 days for the first week numbered 0, the days of the relative week number 1 extending from today+7 days to today+13 days, etc. In other words, the relative week may begin by any day whatsoever of the calendar week, i.e. relative to the weekly program defined in memory 32.

In the charts which are to be described hereinafter, the following data are employed as variables, these data items being capable of being temporarily stored in the lower portion of the zone of the memory appearing on FIG. 6. Thus:

PROG (JR, NE) represents the data item of the weekly base program corresponding to the event NE of day JR (short data item), $0 \leqq JR \leqq 6$ and $0 \leqq NE \leqq 7$ in the example as described.

HRAC represents the data item containing the time of day constantly maintained current by a portion of the program of the microproeessor (long data item).

NXTE represents normally the data item defining the moment of the next event, this data item being the result of a calculation defining this event as a function of the constraints or conditions imposed either by the authorized programmer or by the daily user in the form of as many derogations to the weekly program as are defined in advance. Here we are concerned with a long data item.

AJT0 represents the data item defining the beginning of an inhibition chosen by the daily user (AJT signifying "add"). It is thus the beginning of an additional closing which the daily user may cause to be inserted in a time slot for the present day (short data item).

AJT1 represents the data item defining the end of an inhibition chosen upon opening. This is likewise a short data item.

INH0 and INH1 represent the data containing respectively the beginning and the end of a period of inhibition imposed by the authorized programmer. These are thus long data items.

In order to explain the processing of the significant portions of the long and short data items, the charts employ the following designations of variables:

Mi (x) represents the portion "minutes" of the variable x, where x may be one of the following data items: HRAC, NXTE, AJT0, AJTA, INH0, INH1, PROG (JR, NE).

Hr (x) represents the part "hours" of the variable x.

P (x) represents the bit of the variable x which indicates if the data item is programmed or not.

S (x) represents the bit of variable x which indicates the sense of motion of the sliding block 11 associated with the data item in question.

The four portions of variable bear on the short data items x, and these portions may likewise be assigned to the two first octets of each long data item y which may be one of the following:

HRAC, NXTE, INH0, INH1, these data items being completed by:

JR (y) which represents the portion "days"

Sm (y) which represents the portion "weeks".

Figure 8A:
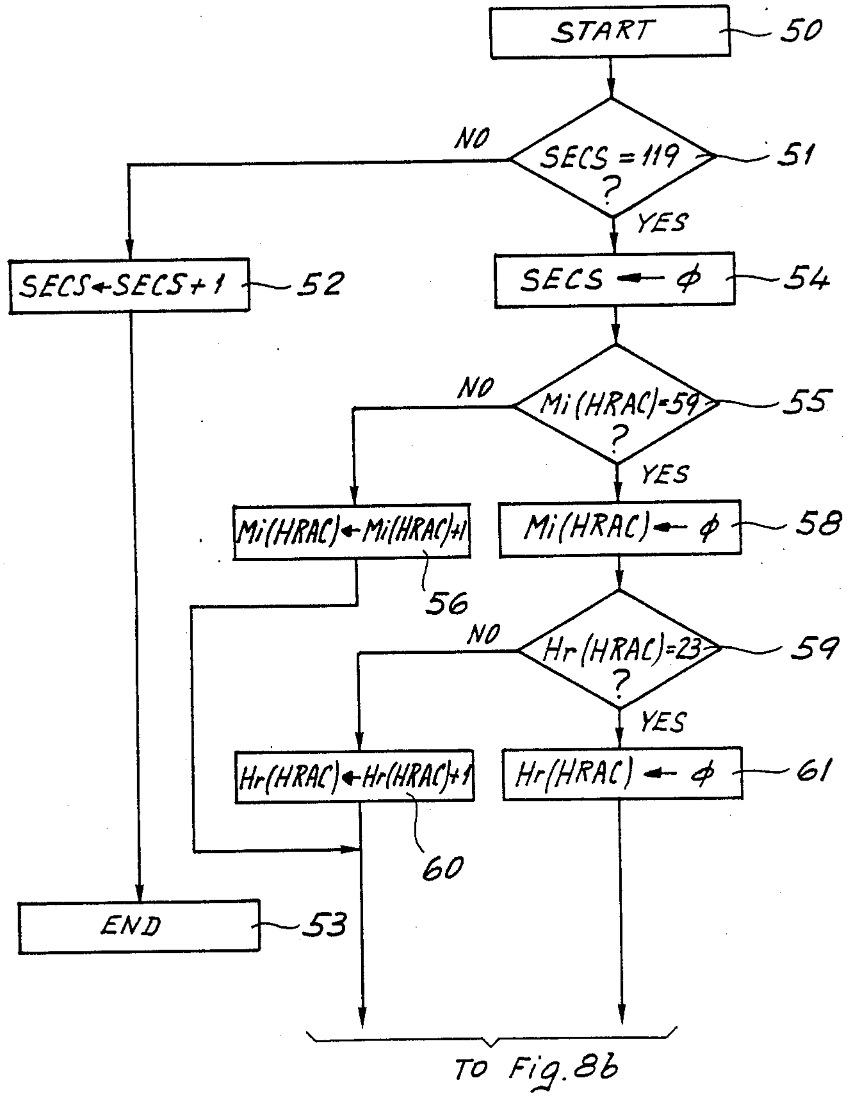
FIGS. 8*a* to 8*c* show a chart of the main program carried out by the micro-processor of the lock assembly according to the invention.
Figure 8B:
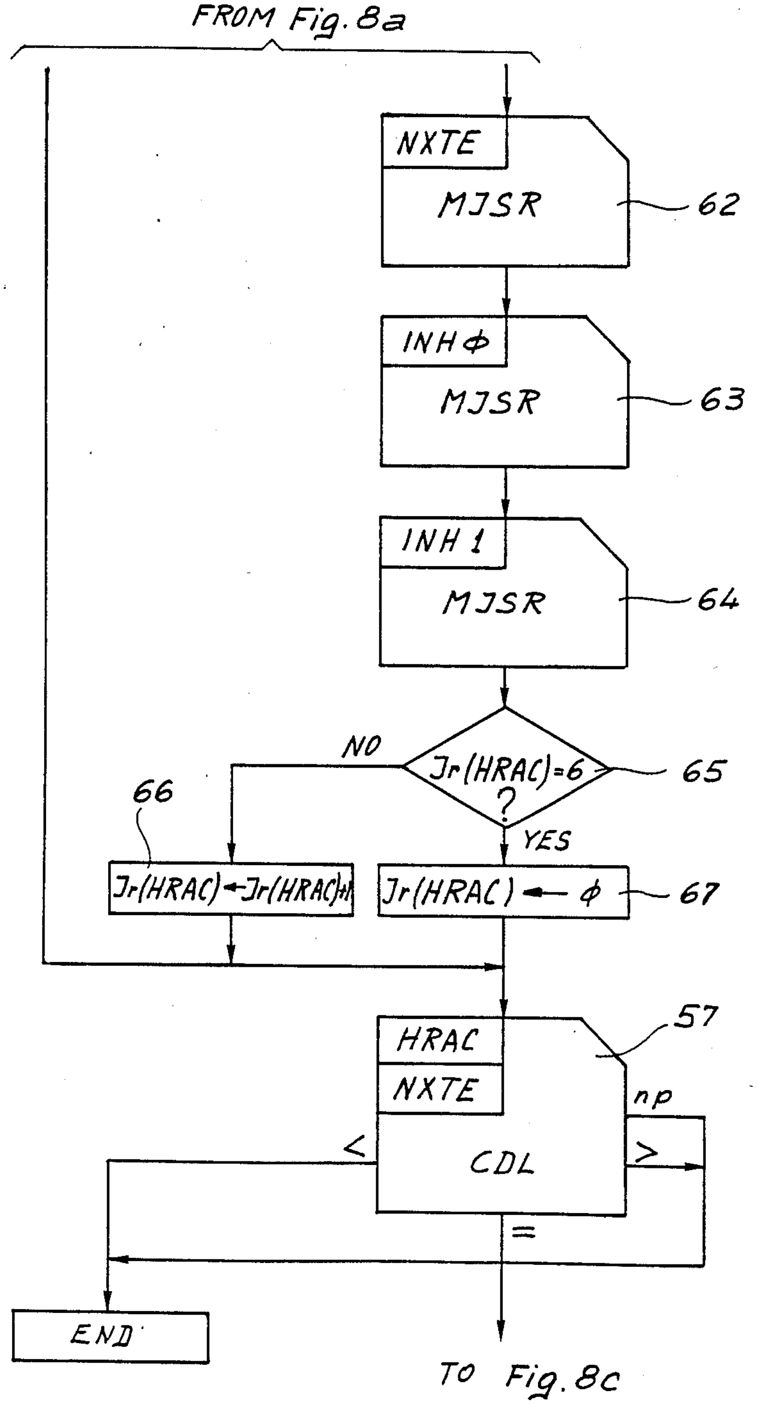
Figure 8C:
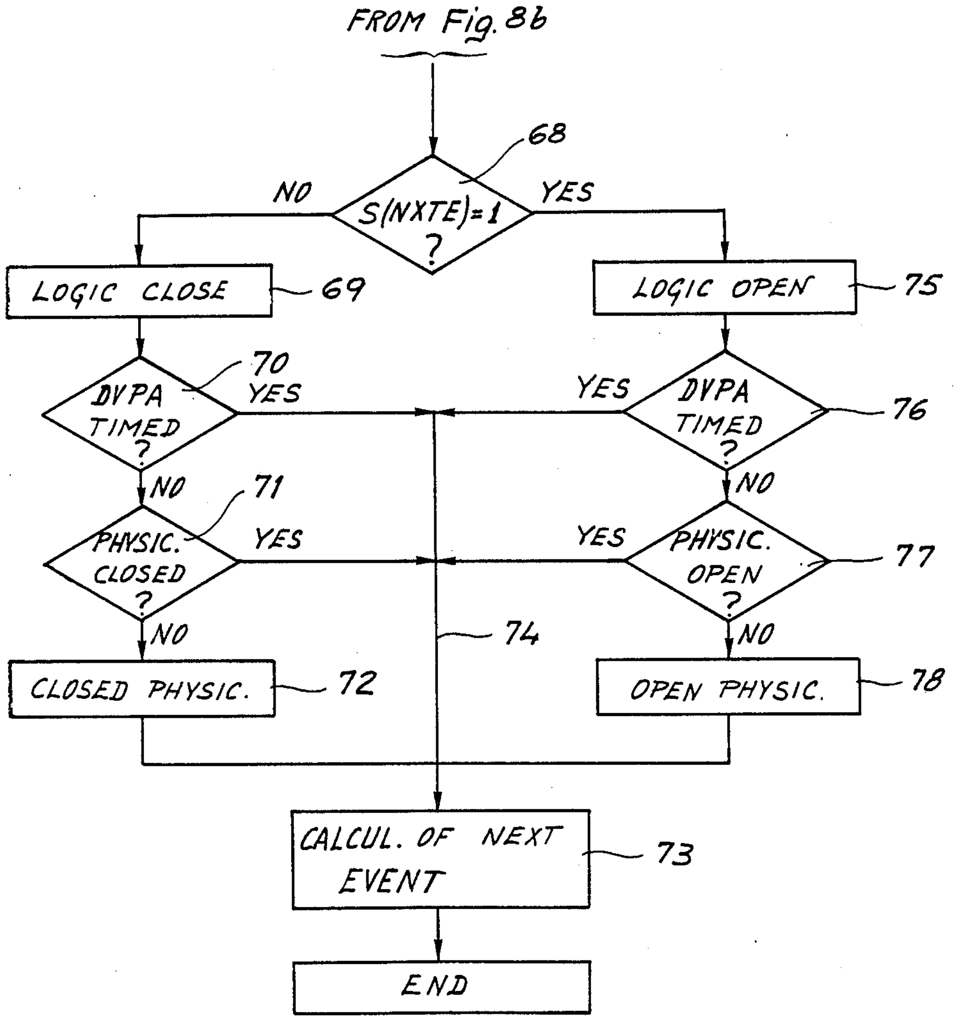

FIGS. 8*a* to 8*c* represent the flow chart of the main program operating in the micro-processor 30. Such main program includes a certain number of sub-programs as well as a calculation loop which runs in the last phase of the execution of the main program. This calculation loop includes itself a certain number of sub-programs all of which will be described in detail hereinafter.

The main program is essentially formed by four portions of which the first assures calculation of the time (FIG. 8*a*), the second has as essential purpose to compare present time to the data item NXTE defining the event previously calculated, the third portion assuring the control of the movement of sliding block 11 as a function of the constraints imposed by the program and the fourth being the calculation loop of which mention has been made above.

The main program is executed every half-second under the control of a signal which is applied to the microprocessor 30 by the time base 31. This latter may be formed by a well-known divider chain controlled by a quartz oscillator.

At the start-up at 50 (FIG. 8*a*) a test is initially effected at 51 in order to determine if the contents of a seconds register SECS is equal to 119. It will be noted in passing that the program employs a certain number of registers which in a well-known manner form part of the microprocessor 30.

If the test is negative, the contents of the register are increased by one at 52 and the program ends at 53 until beginning of the next half-second. If on the other hand the test comes out positive, the number zero is placed in the register SECS (operation 54).

It will be understood that the number examined in the course of test 51, chosen here to be 119 (120, i.e. two minutes) is a function of the frequency at which one wishes to execute the main program and it may be different once every two minutes.

The contents of the register SECS being established at zero, a test is effected at 55 in order to determine if the first octet of the data item HRAC contained in memory 32 (units and tens of minutes) is equal to 59. If this test comes out negative, the contents of the octet in question is increased by one at 56 and the program passes to a sub-program "long comparison" 57 (FIG. 8*b*) of which a detailed description will be given hereinafter. If test 55 comes out positive, the number zero is placed in the cited octet at 58 and the program passes to a test 59 in order to determine if the contents of the second octet of the data item HRAC contains a number of hours equal to 23. Should this test be negative, the contents of this octet is increased by one at 60 and the program likewise passes to the sub-program 57. If on the other hand, the test appears positive, the number zero is placed in the octet in question at 61. This signifies evidently that one goes from one day to the following day since the time ban corresponds to midnight.

The program next passes by three sub-programs 62, 63 and 64 referred to as "program for setting relative weeks" of which a detailed description will be given hereinafter (FIG. 8*b*).

This updating being effected if necessary, the program passes to a test 65 in order to determine if the contents of the days portion of octet 3 of the data item HRAC is equal to 6. If the test should be negative, the contents of this portion of octet 3 is increased by one at 66 and the program passes to the sub-program 57. On the other hand, in the case of the test appearing positive, zero is placed in the concerned portion of octet 3 (operation 67) and the program likewise goes to sub-program 57.

Figure 9:
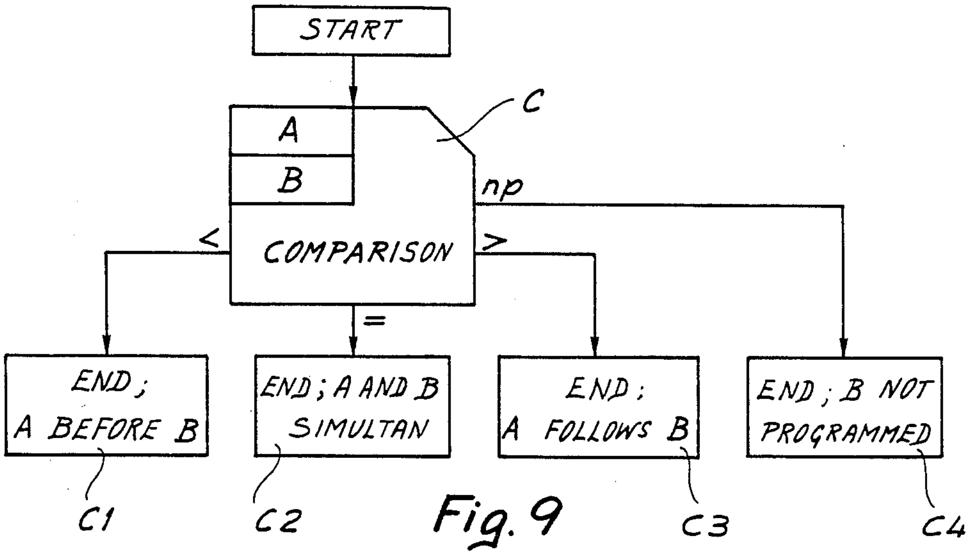
FIG. 9 shows the principle of a sub-program for comparison.

In a general manner, in the course of running the entire program, comparisons must be effected between the time data representing the variables which may appear progressively. These comparisons may be realized on long and short data items and may give rise to four results illustrated on FIG. 9, in supposing that one of these data items is designated by A and the other by B. FIG. 9 is a general comparison sub-program "C" the details of the corresponding sub-programs CDC and CDL appearing respectively on FIGS. 10 and 11. As these are concerned with time data, the four results may be the following: A precedes B (C1), A and B are synchronous (C2), A succeeds B (C3) and finally B is not programmed (C4) which is to say that its P bit is at zero.

Figure 10:
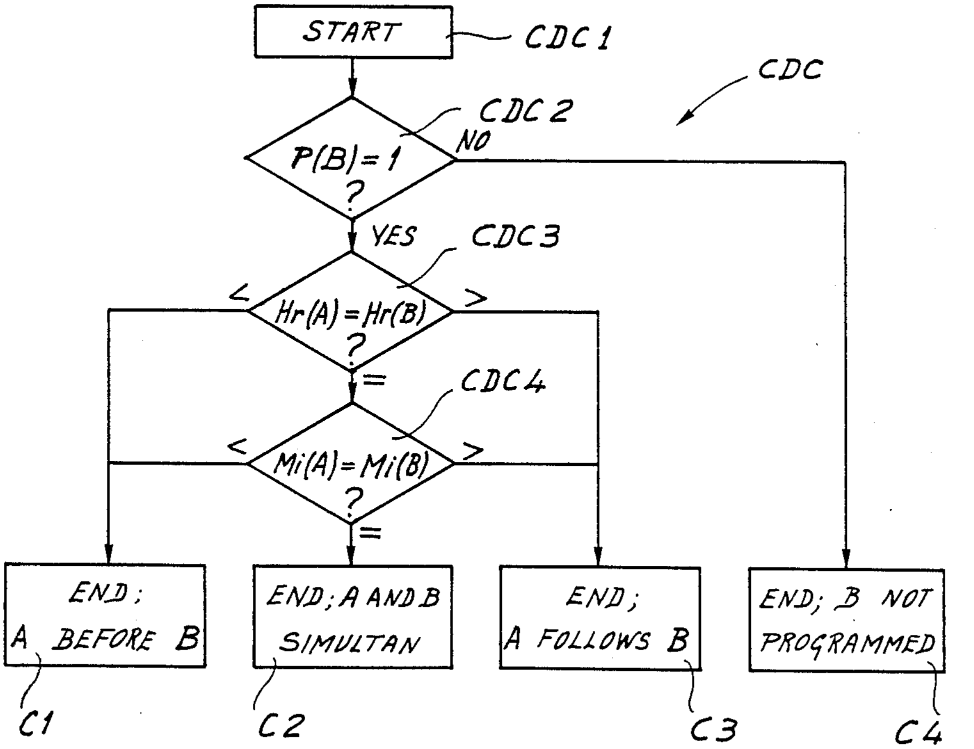
FIG. 10 is the chart of a sub-program of comparison on short data.

The comparison of the short data item CDC proceeds in the following manner (FIG. 10). Following start up (CDC1), a test is effected at CDC2 to check the value "1" of the bit P of data item B. Should this test come out negative, B is not programmed and one may pass to the following operation. On the other hand, if this test comes out positive, a further test is effected at CDC3 in order to determine if the value "hours" of variable B is greater, equal to or less than the value "hours" of variable A. Failing equality, the same test is carried out for the values in minutes of the two variables (CDC4), from which there results the determinations C1 and C3. If the values of the minutes of both variables are equal, one obtains the result C2.

Figure 11:
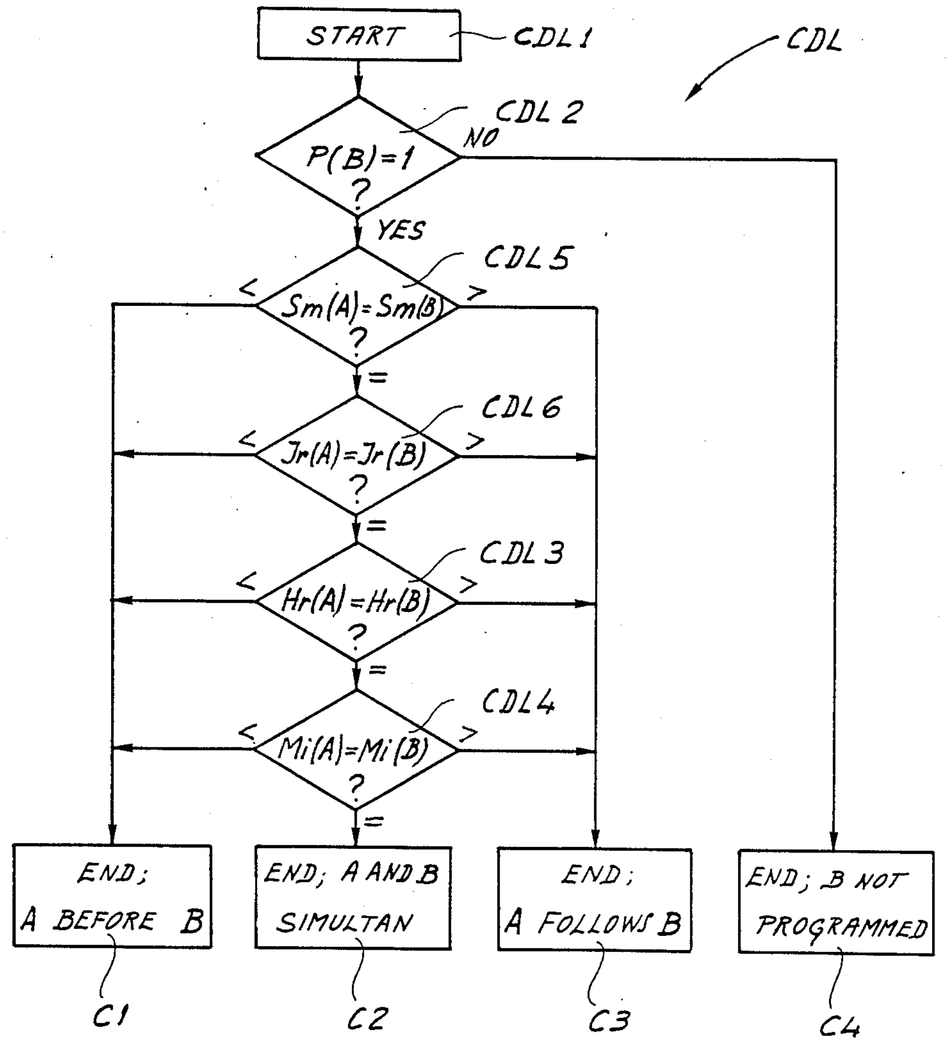
FIG. 11 is a chart of a sub-program of comparison on long data.

When concerned with variables corresponding to long data items, there are added to the sub-program CDC two complementary tests (sub-program CDL) bearing respectively on the values of the days and the weeks of the variables A and B, these tests being indicated by the references CDL5 and CDL6 on FIG. 11, the other operations, identical to sub-program CDC bearing references CDL1 to CDL4.

Returning now to FIG. 8*b*, it is seen that the sub-program 57 in accordance with the procedure of FIG. 11, corresponds to the long comparison CDL, of the variable HRAC and the variable NXTE which, expressed in time data, is the time when the next event is to take place, this latter variable having been calculated previously. It depends thus from the time program of curve a of FIG. 5 and the constraints introduced by the inhibitions as imposed and chosen according to curves b and c of this same figure.

If, during the execution of sub-program 57, it appears that the variable NXTE has not been programmed or that it is less or greater than the variable HRAC, the main program comes to an end and the arrangement awaits start up of the following program in returning to the start up operation 50 when a half-second has elapsed. On the other hand, when there is equality between the two variables, the main program will carry out its third part in order to place the sliding block 11 into the position demanded by the data obtained following execution of sub-program 57.

Thus, a test is carried out at 68 to determine at which value the bit S of variable NXTE has been established. If this bit is zero, the circuit generates a signal "logic closing" 69 which does not yet signify that motor 20 driving the sliding block 11 will be operated in the sense of closing. Effectively, it is necessary initially to examine the position in which such sliding block is found. After having effected a test 70 the utility of which will be explained hereinafter and in the event that the response to this test is negative, a test is carried out to determine in which position the sliding block 11 is actually found as a function of the positions of switches 26 and 27. It then it is determined that the sliding block is open, the motor is energized according to operation 72 and the sliding block is raised by motor 20 controlled by the microprocessor through amplifier 33. The program then passes to the loop "calculation of the next event" 73. If tests 70 and 71 are positive, the program likewise passes to this same loop 73 by the common operation 74.

Should the result of test 68 be affirmative, the same operations are carried out but this time with respect to the matter of opening of sliding block 11, the program passing via operations 75 to 78 all of which likewise end up on loop 73.

It is thus determined that when the first three parts of the main program have been executed, the arrangement places the sliding block in the position required by the constraints illustrated on FIG. 5 as a function of variable NXTE previously calculated, after which during the fourth part, the arrangement will examine the nature of the next event and calculate therefrom exactly the following variable NXTE which is then stored in memory 32 to be employed during the execution of the next sub-program 57 leading to the comparison with present time.

There will now be described this fourth part, i.e. the program loop 73 serving to calculate the data item NXTE translating the time coordinates of the next event to be carried out. This loop is initiated at 79 (FIG. 12*a*) and the first operation consists in placing in memory 32 at the position of the data item NXTE the data item HRAC of present time as worked out in the course of the first part of the main program (FIG. 8*a*).

Next there is effected a sub-program CDL at 81 between the data item NXTE and the contents of the two octets corresponding to data item INH1. If, at the end of this comparison, it appears that INH1 has not been programmed, is greater than the variable NXTE (corresponding to this moment of actual time) or is equal to this data item, the program passes to a following sub-program 82 called "localization in the weekly program" (LPH; see FIG. 12*b*).

If, on the other hand, the comparison of the sub-program 81 leads to determination that INH1 is less than NXTE which signifies that the present time is situated, either in an inhibition period as imposed or before such period, it is necessary to determine by the sub-program CDL 82, which is a long comparison between INH0 and NXTE, if the present time is located in the period of inhibition imposed or before such period. If the sub-program 83 determines that present time is still before the inhibition period, the program passes to sub-program 82. On the other hand, if it appears that there is equality between the two data items, the program passes to operation 84 (FIG. 12*e*) which consists in placing data item INH1, i.e. the end of the imposed inhibition period in the octets of memory 32 corresponding to the variable NXTE whilst expelling from these octets the data item HRAC which was previously stored therein. Further on will be described the operations following this introduction of NXTE in the octets according to operation 84.

Figure 13:
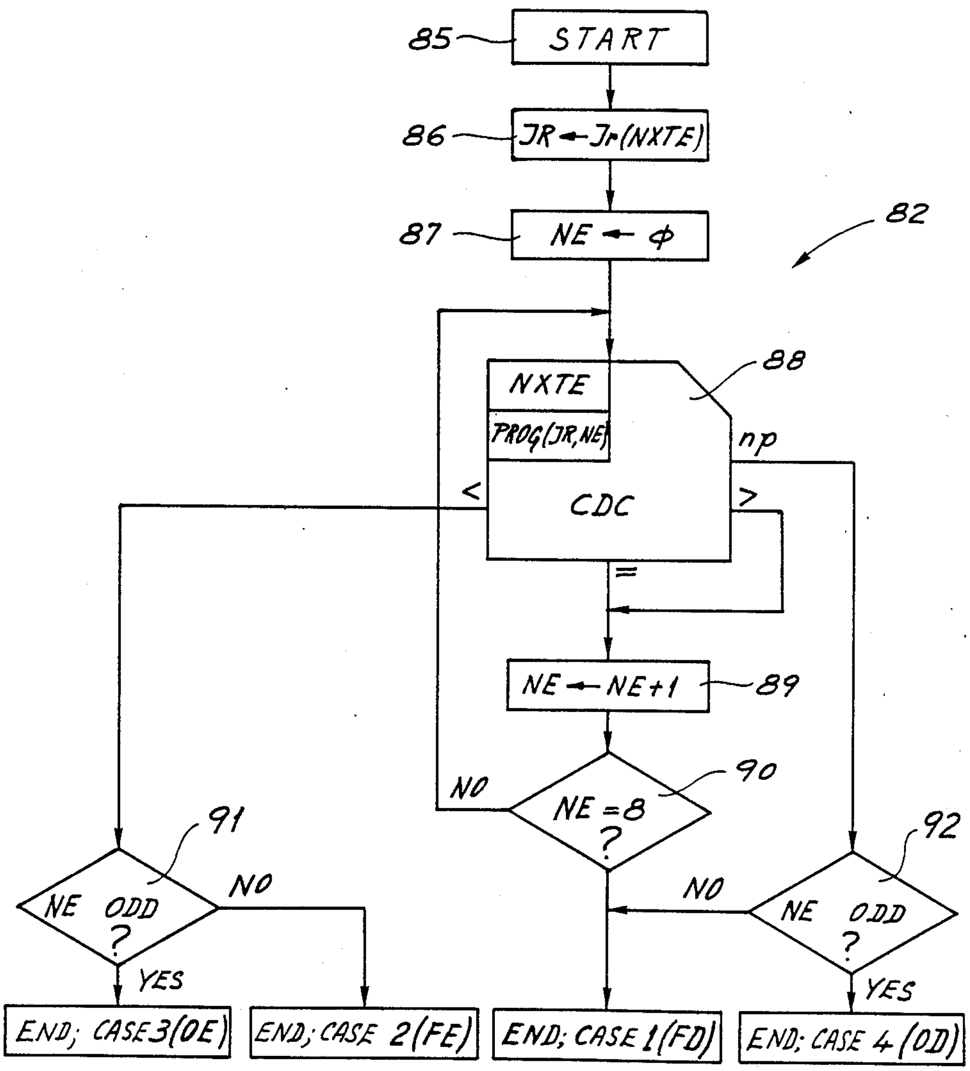
FIG. 13 represents the chart of a sub-program enabling the determination of the relationship between the time of day and the pre-established weekly program.

There will now be described sub-program LPH 82 in referring in particular to FIG. 13.

Sub-program 82 has as its purpose to determine if the data contained at this moment in octets NXTE, according to operation 80 (FIG. 12*a*) falls in an opening time slot of the corresponding day of the weekly base program (FIG. 5) and to determine if there exists an event of the corresponding day which follows this data. This sub-program 82 is initialized at 85 and the first operation 86 consists in placing into a register JR of the microprocessor the bits of the third octet of the data item NXTE (which corresponds thus to to-day), then during an operation 87 to place the number zero in another register NE of the micro-processor. The contents of registers JR and NE are then employed as indicator of the octets of the memory 32 in which is stored the weekly program (curve a of FIG. 5). The contents of the octets designated by the indicator (at present these are e.g. the two octets for opening the window $F_1$ which are then extracted from the memory) is subjected to a sub-program of comparison at 88 according to the comparison process illustrated on FIG. 9).

Before examining the possible results of the comparison effected by sub-program 88, it is useful to indicate that the parity of number NE is representative of the state of opening or of closing of a time slot, an odd number corresponding necessarily to opening and an even number to closing, it being understood that in the example shown at maximum four successive openings and closings may be provided, the number NE of the events being thus at maximum equal to eight.

If the comparison as carried shows that NXTE and PROG (JR, NE) are equal, the contents of register NE is increased by one at 89 and a test is carried out at 90 to determine if NE is equal to the maximum possible number of events programmed in the weekly program, this number being eight in the example as described. If this test should turn out negative, the program returns to sub-program 88 in order to extract from the memory the second event of the day to which the registers JR and NE point. A new comparison is then effected on NXTE, i.e. present time and PROG (JR, NE).

If at the end of test 90 it appears that NE is equal to 8, one is confronted with a first case which can result from the sub-program 82. Effectively, it will then be known that the sliding block 11 is in its closed position and that no event in the weekly program follows the present hour of the day on that particular day.

If the comparison effected by sub-program 88 indicates the present time (NXTE) precedes PROG (JR, NE), the program carries out a new test at 91 to determine if NE is even or odd. If NE is even, one is confronted with a second case, namely that the sliding block is in its closed position and that there is an event in the program which comes after the present time on that particular day. If on the other hand the test carried out at 91 turns out positive, we have a third case corresponding to the open position of sliding block 11 and programming of the end of the existing time slot for that day.

If the comparison effected by sub-program 88 ends up establishing that the present time is after PROG (JR, NE), the program continues as previously described relative to the determination of equality of the two corresponding data items. If finally the sub-program 88 establishes that PROG (JR, NE) has not been programmed, the program passes to a test 92 in order to examine the parity of the number NE. If this number is even, we are confronted with case number 1 otherwise we are confronted with case number 4 corresponding to the open position of sliding block 11, i.e. the present time is located in an opening time slot and this slot lasts until midnight of the present day. Thus by referring again to FIG. 12*b* it is seen that sub-program 82 gives place to four possible cases, which are now to be successively examined.

Figure 14:
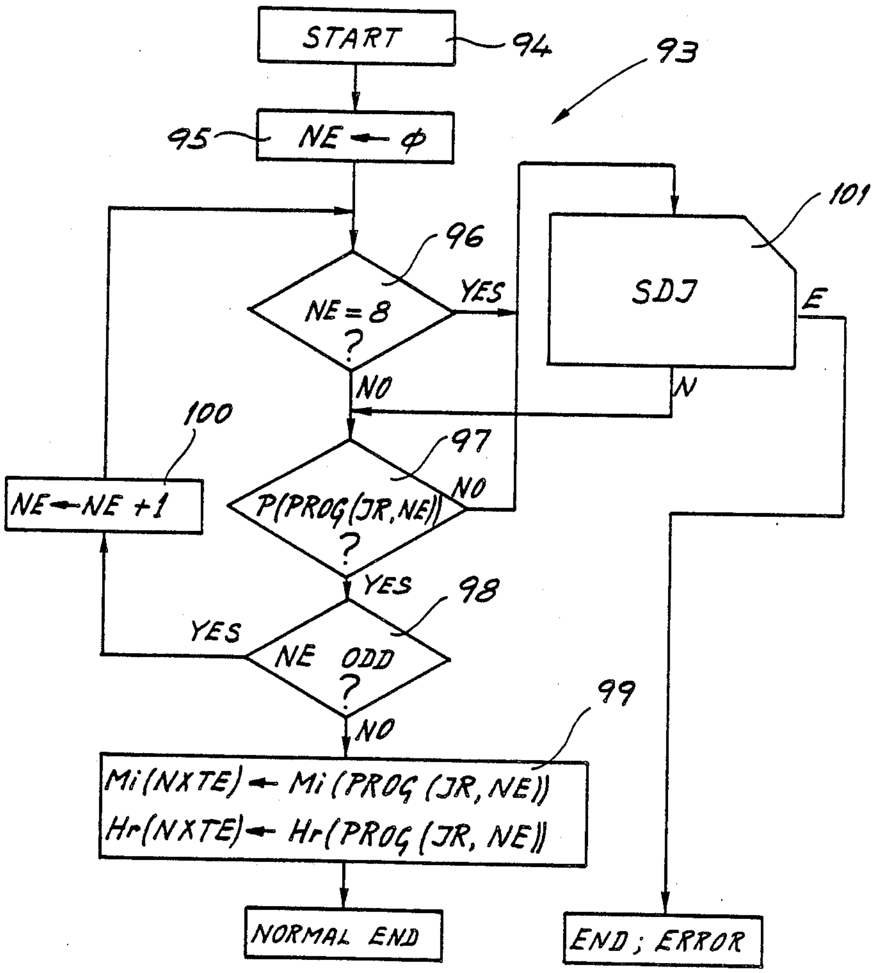
FIG. 14 shows the chart of a sub-program for searching the beginning of the next time slot.

If sub-program 82 leads to case number 1 or 2, the program passes to a sub-program RDPF 93 (Search for the Beginning of the Next Time Slot), the operations of which have been shown in detail on FIG. 14 to which reference is now made. Sub-program 93 is initialized at 94 and the first operation consists of placing in register NE the value zero (operation 95). Next a test is carried out to determine if NE is equal to the maximum number of events for the day (operation 96). If test 96 establishes inequality, the program passes to a test 97 to determine the program bit P of the data item PROG (JR, NE). If this bit is equal to one, a test is carried out at 98 to determine the parity of the number NE and if this test shows even parity, the values of minutes and hours of the data item PROG (JR, NE) are introduced into the corresponding bits of the three octets of signal NXTE in rejecting the data of the actual time which was previously found (operation 99). Following the program returns to the main program.

If the test at 98 shows odd parity, the register NE is incremented by one at 100 and the program returns to test 96 and the previously described operations are repeated.

Figure 15:
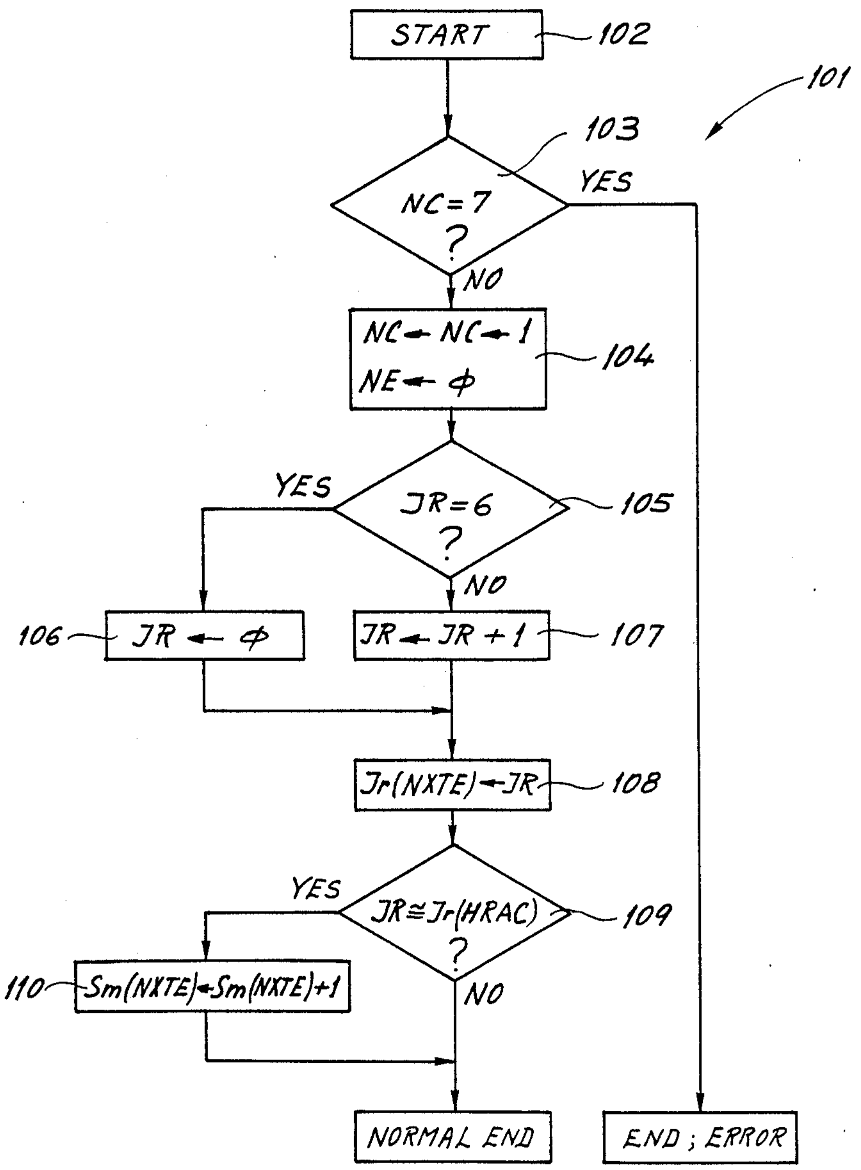
FIG. 15 shows the chart of a sub-program for jumping a day.

If the result of the test 96 is positive or if that of the test 97 is negative, the program passes to a sub-program SDJ 101 called "jump one day" which will now be examined with reference to FIG. 15.

This sub-program is called up when one searches the next event of the weekly base program and upon having already attained the last programmed event of the day on which one is presently working, it is necessary to pass to the following day. In this sub-program an auxiliary variable NC is employed which has as purpose to avoid that in the absence of a program the day is changed more than seven times.

The sub-program 101 following initialization at 102 effects a test 103 in order to determine if the contents of register NC is equal to 7. If such should be the case, we have an error which is indicated on the display arrangement and which has as a consequence the opening of the sliding block 11, which is moreover the case each time an error is determined during running of the program.

If test 103 comes out negative, register NC is incremented by one (operation 104) and the number zero is placed in register NE. Then a test is carried out at 105 to determine if the contents of register JR is equal to 6. If this test is positive, the number zero is placed in register JR and in the other case this register is incremented by one (operations 106 and 107). Next the operation 108 consists of transferring the contents of register JR into the corresponding bits of the data item NXTE in the memory 32. Thereafter a test is carried out 109 to check the equality between the contents of the register JR and the day of the data item HRAC. If this test results as negative, the program returns to test 97 of sub-program 93 (FIG. 14) otherwise the number in the data item NXTE corresponding to the week is incremented by one (operation 110) following which likewise one returns to test 97.

Figure 12A:
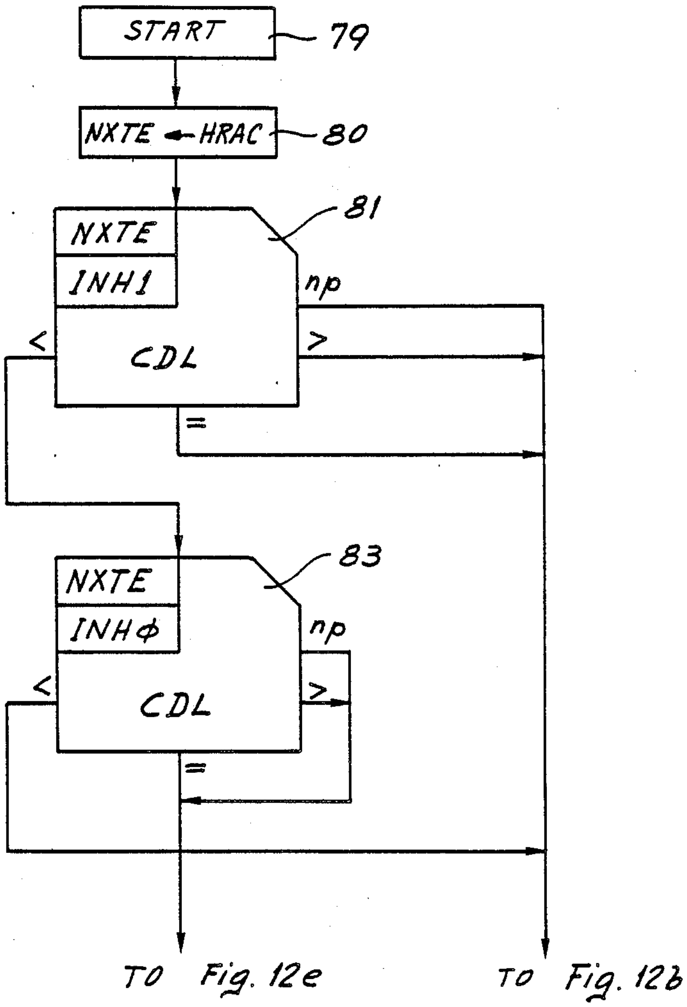
FIGS. 12*a* to 12*e* form together the chart of the sub-program for calculating the next event.
Figure 12B:
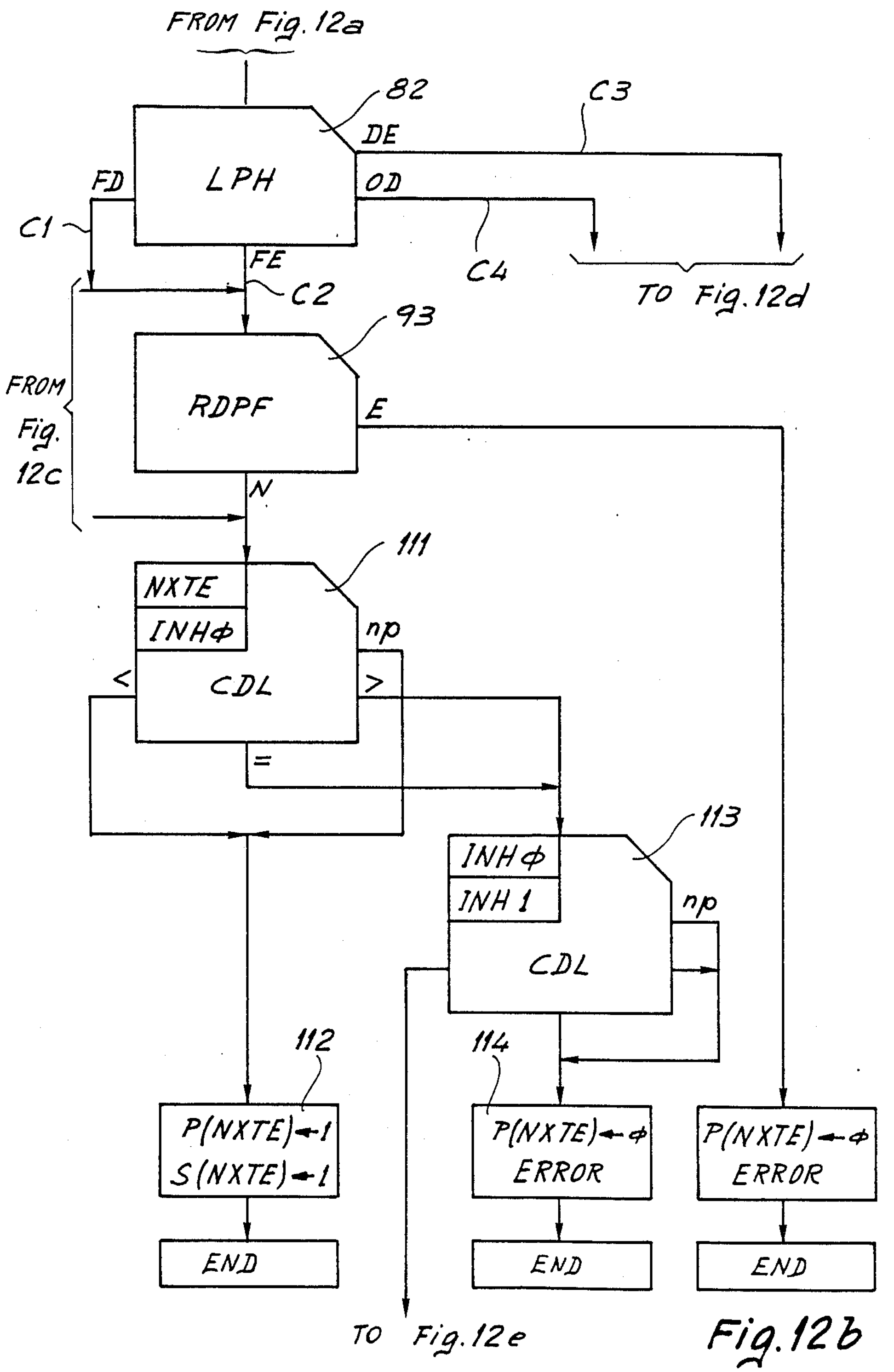
Figure 12C:
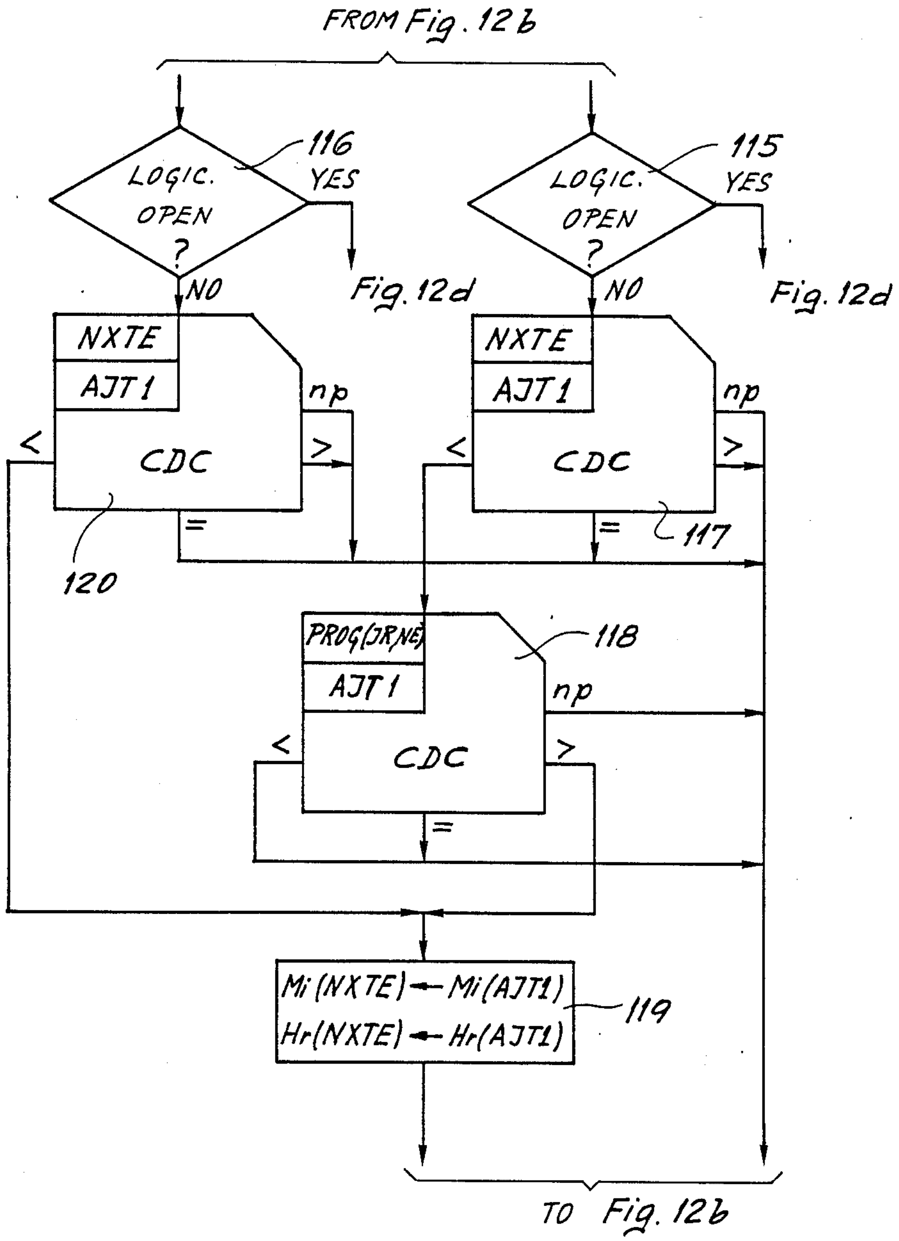
Figure 12D:
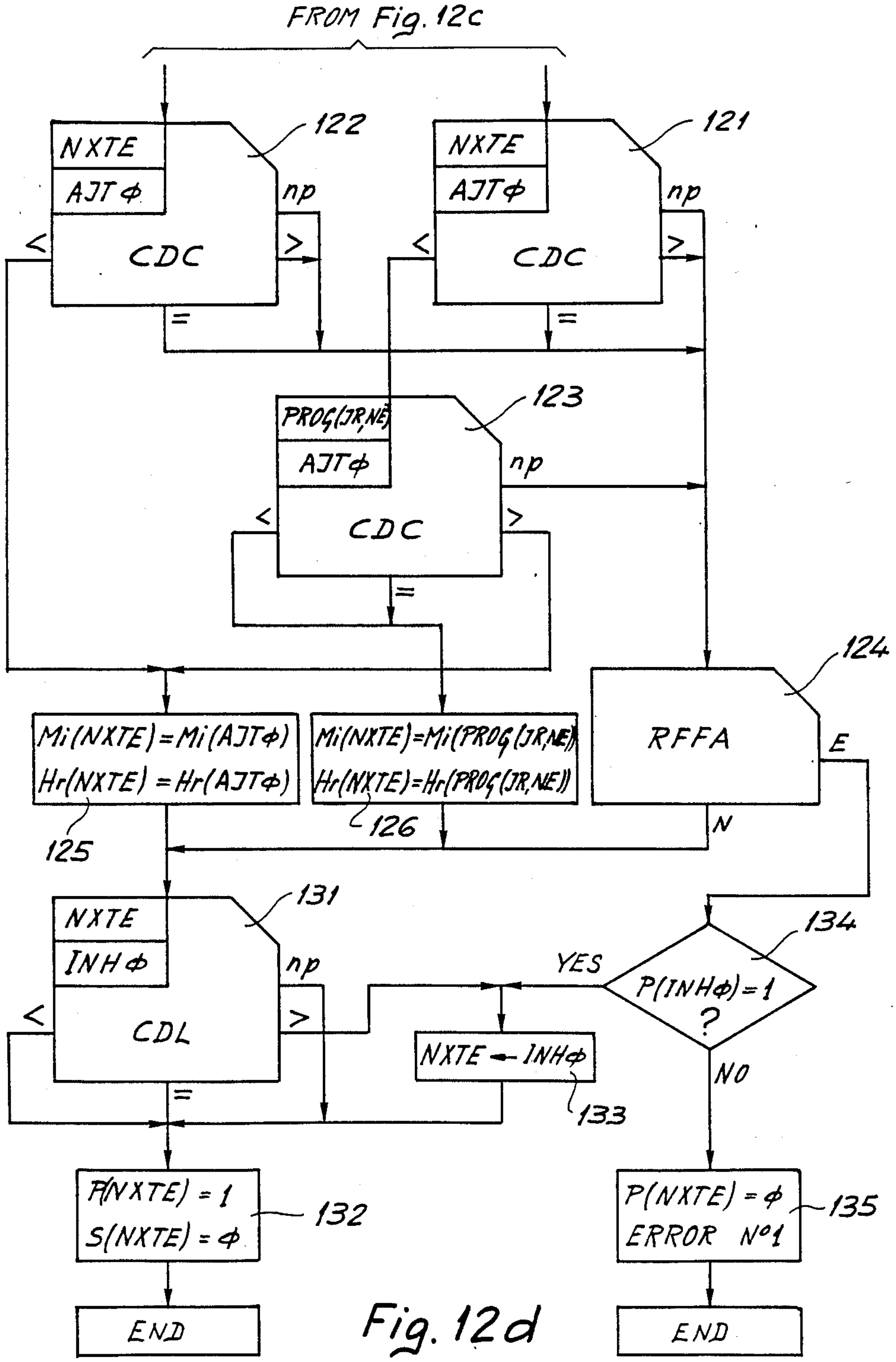
Figure 12E:
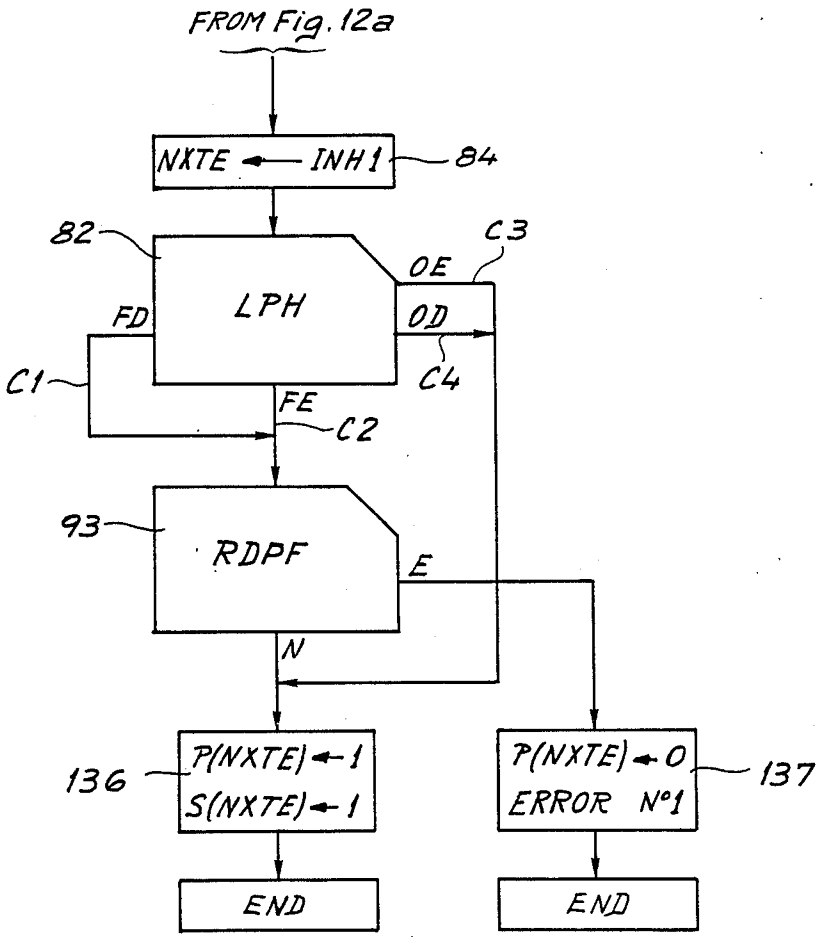

At the issue of the operation 99 of sub-program 93, the program goes to a sub-program 111 (FIG. 12*b*) which consists of effecting a long comparison between the contents of the octets of data item NXTE which then corresponds not to the present time, but to a calculated value and the data item INH0. If this comparison determines that INH0 has not been programmed or if NXTE is before INH0, the program passes to operation 112 which consists of placing in the P and S bits of the data item NXTE the value 1 which completes calculation of this data item. If on the other hand, the comparison establishes equality between NXTE and INH0, or if NXTE is after INH0, a new long comparison is carried out at 113 between INH0 and INH1. If INH1 comes after INH0, the program passes to operation 84 (FIG. 12*e*). In the other three cases, we are in the presence of an error (operation 114) and a zero is placed in the bit PNXTE.

There will now be examined the running of the operation when during execution of sub-program 82 (FIG. 12*b*) cases number 3 and 4 are determined recalling that case number 3 corresponds to the open position of the sliding block and programming of the end of the present time slot while case number 4 likewise corresponds to the opening position of the sliding block, the time slot being established until midnight.

When case number 3 has been established, the program passes to a test at 115 (FIG. 12*c*) while for case number 4, a test is carried out at 116, tests 115 and 116 having as purpose to determine if an opening order exists. If test 115 turns out negative, a short comparison sub-program 117 is carried out between the data item NXTE which here is the data item corresponding to the hour of the day and the data item AJT1 which is relative to a chosen inhibition. If this last data item has not been programmed or if it should be equal to or less than the data item NXTE, the program loops back onto the sub-program 93 (FIG. 12*b*). If on the other hand AJT1 is greater that NXTE, the program passes to a new sub-program 118 of short comparison between the data item PROG (JR, NE) (see sub-program 82) and the data item AJT1. For the case where AJT1 has not been programmed or if it is equal to PROG (JR, NE) or again if AJT1 follows PROG (JR, NE), the program likewise reloops into the sub-program 93. On the other hand, if PROG (JR, NE) follows AJT1, the values of minutes and hours of this data item are transferred into the corresponding bits of the octets NXTE of memory 32 (operation 119). After this operation, the program loops back to sub-program 111 of long comparison to complete the other bits of the data item NXTE by the operation 112, or to determine errors (operation 114).

The test carried out at 116 being negative, a short comparison is likewise carried out on data items NXTE and AJT1 (sub-program 120), but in this case it is only when NXTE (actual time) comes before AJT1 that one passes to operation 119, the other three cases leading back to sub-program 93. If tests 115 and 116 turn out positive, the same comparison operations are effected on the data item AJT0 in conformity with sub-programs 121, 122 and 123 (FIG. 12*d*).

Figure 16:
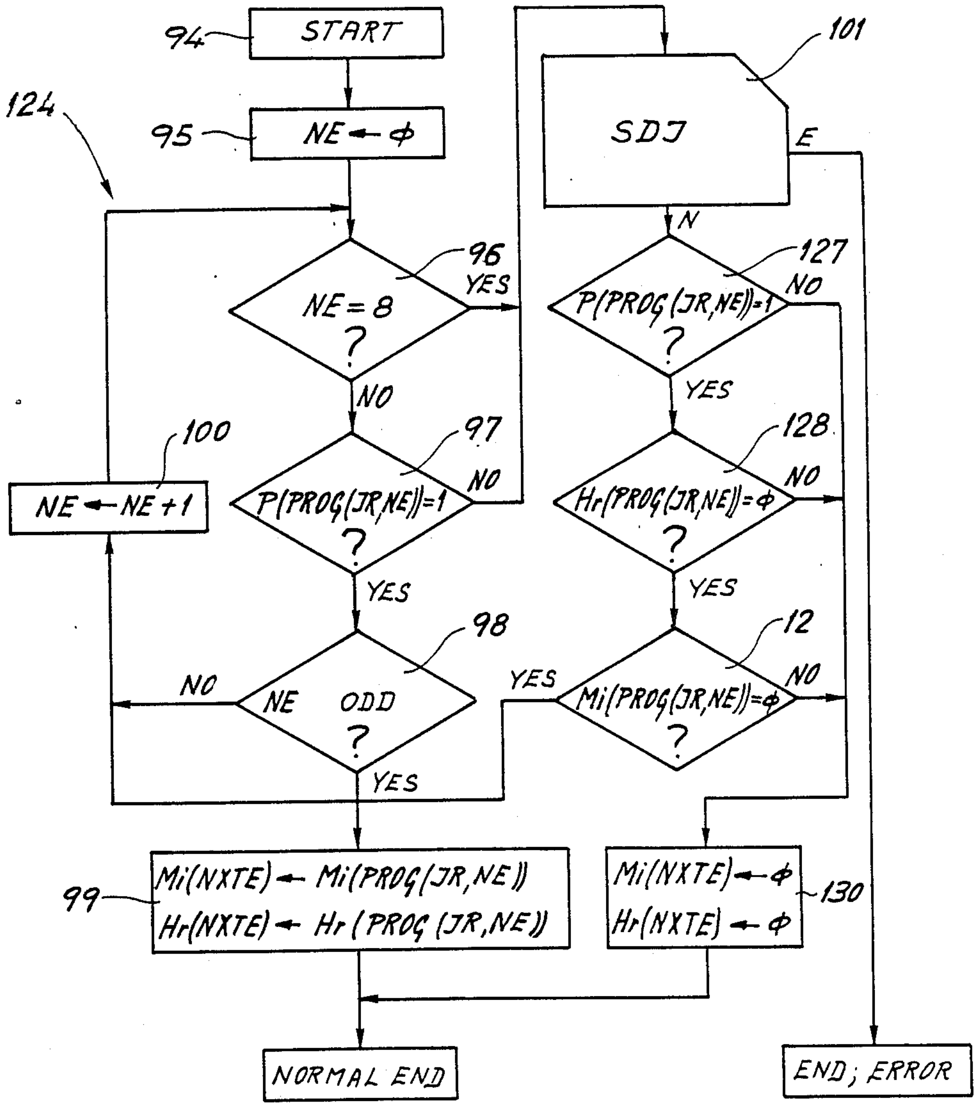
FIG. 16 shows the chart of a sub-program for the searching for the end of the present time slot.
Figure 17:
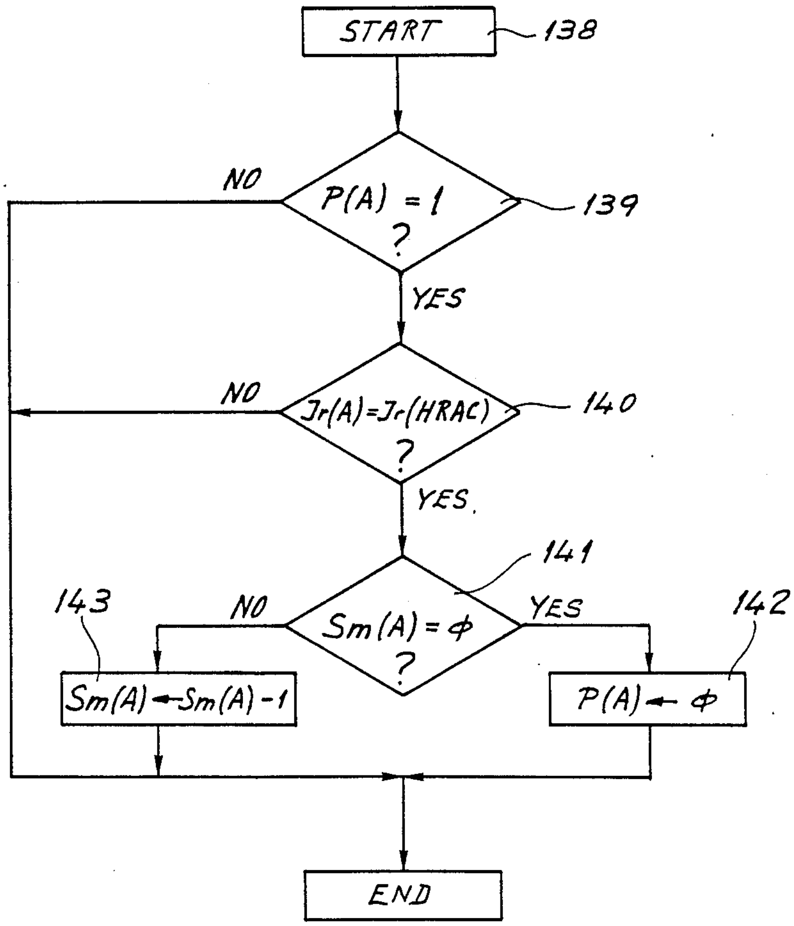
FIG. 17 shows the chart of a sub-program for setting the relative week.

When sub-programs 121 and 122 establish either that AJT0 has not been programmed or that NXTE is greater than AJT0, or again that the two data items are equal, the program passes to a sub-program RFFA 124 to search for the End of the Present Time Slot (FIG. 16). The program likewise branches onto this sub-program 124 at the end of execution of the sub-program 123 when it appears that AJT0 has not been programmed or when AJT0 is greater than PROG (JR, NE).

If the comparison made during running of sub-program 122 ends up by establishing that AJT0 is greater than NXTE, the values of minutes and hours of the data item AJT0 are placed with corresponding bits of octets of the data item NXTE in replacement of the corresponding values of the present time HRAC (operation 125). In the same manner if following running of sub-program 123, it appears that AJT0 is greater than PROG (JR, NE), the values of minutes and hours of this data item are placed in the corresponding bits of the data item NXTE of memory 32 (operation 126).

The sub-program RFFA 126 has as its purpose to search for the end of the present time slot to enable at the end thereof to place the value 0 in the bit "S" of signal NXTE, so as to bring about the movement of the sliding block 11 in the closing sense.

Sub-program 124 (FIG. 16) runs almost entirely like sub-program 93 in conformity with operations 94 to 101 already described with reference to FIG. 14. The difference consists in that following running of sub-program 101 (FIG. 15) i.e. when test 109 is negative or when the updating of the bits of signal NXTE corresponding to the number of weeks is carried out according to operation 110, sub-program 124 effects a test 127 in order to determine if the bit P of data item PROG (JR, NE) is equal to 1, it being recalled that this data item has been extracted from the memory as a function of the contents of registers JR and NE. If this test 127 is positive, two sucessive tests 128 and 129 are effected on the values of hours and minutes of the data item PROG (JR, NE) to determine if these values are equal to zero. If tests 128 and 129 turn out negative, the zero values are introduced in the corresponding bits of the octets of the data item NXTE in conformity with the operation 130, after which the program branches onto the program 73 for calculating the next event (FIG. 12*d*). If tests 128 and 129 are both positive, this indicates that in accordance with a special case, an opening time slot has been programmed which extends over midnight. It is then necessary to look up the following event of the new day in a manner such that one increases the value NE according to operation 100.

Operations 127 to 130 have as purpose to avoid that when the opening is programmed to extend over midnight the sliding block is not brought successively to the closing position and to the opening position, but remains on the contrary in the opening position in spite of the fact that in reality at midnight conventionally, the sliding block 11 must always be in its closing position.

If, following the running of sub-program 124, no error has been noted, the program (FIG. 12*d*) passes to a long comparison sub-program 131 to check whether the present value of the data item NXTE does not correspond to a data item INH0, that is to say with beginning of an imposed inhibition.

If the data item INH0 has not been programmed or if it comes after NXTE or again if it is equal to INH0, values of 1 and 0 are respectively placed in the bits P and S of the data item NXTE (operation 132), after which the calculation of NXTE has been accomplished.

If, on the other hand, data item NXTE follows INH0, this latter data item is placed in the octets of NXTE (operation 133) following which the same values of bits are placed in the bits P and S of NXTE, according to the operation 132. The same operation is carried out if following a test 134 made after determination of an error in the sub-program 101 running in the framework of execution of the program 124 (FIG. 16), one checks whether the bit P of the data item INH0 is equal to 1. If such is not the case, 0 is placed in this bit and an error is noted.

Returning to FIG. 12*a*, in case of equality between NXTE and INH0 in the course of running sub-program 83, NXTE will then be in a period of inhibition. The sliding block 11 is then in its closed position and it is necessary to search out the beginning of the first time slot which follows the end of the inhibition. The program then continues in the manner following (FIG. 12*e*).

The operation 84, already mentioned, consists of placing in octets NXTE the value INH1 after which sub-program 82 is executed to localize this data in the weekly program.

If sub-program 82 ends at case number 1 or case number 2, sub-program 93 will be executed to search for the beginning of the following time slot. If cases number 3 or number 4 are presented, the values 1 are respectively placed in the bits P and S of the data item NXTE and the calculation of the next event comes to an end. If the sub-program 93 ends up with the determination of an error, the value 0 is placed in the bit P of the data item NXTE and an error is noted (operations 136 and 137).

We will now return to the main program, and more precisely to sub-programs 62, 63, 64 appearing on FIG. 8*b*. It has already been indicated that imposed inhibitions employ the notion of relative week the definition of which has been given. In view of this relativity, the variable which has described it varies with the progression of time in a manner such that when one passes from one day to another it is necessary to update the data which contain the indication of the relative week, namely the data items NXTE, INH0 and INH1. This is precisely the role of sub-programs MJSR 62, 63 and 64 which are all the same and which have been represented once only on FIG. 17. Following start-up at 138, this sub-program determines initially if the data item in question is programmed by means of test 139. If it has not been programmed, the sub-program comes to an end. If it has been programmed, there is determined in the course of test 140 if the value of the day of the data item HRAC corresponds to the value of the day of the data item examined. If no correspondence exists, the sub-program comes to an end. If there is correspondence, there is then verified during test 141 if the value of the week of the data item examined is equal to zero. Should such be the case, the value zero is placed in the bit P of the data item which has been examined. On the other hand, if such is not the case, the value of the week of the data item examined is decreased by one (operations 142 and 143, respectively) following which the sub-program in question comes to an end and the operations return to the main program.

Figure 18A:
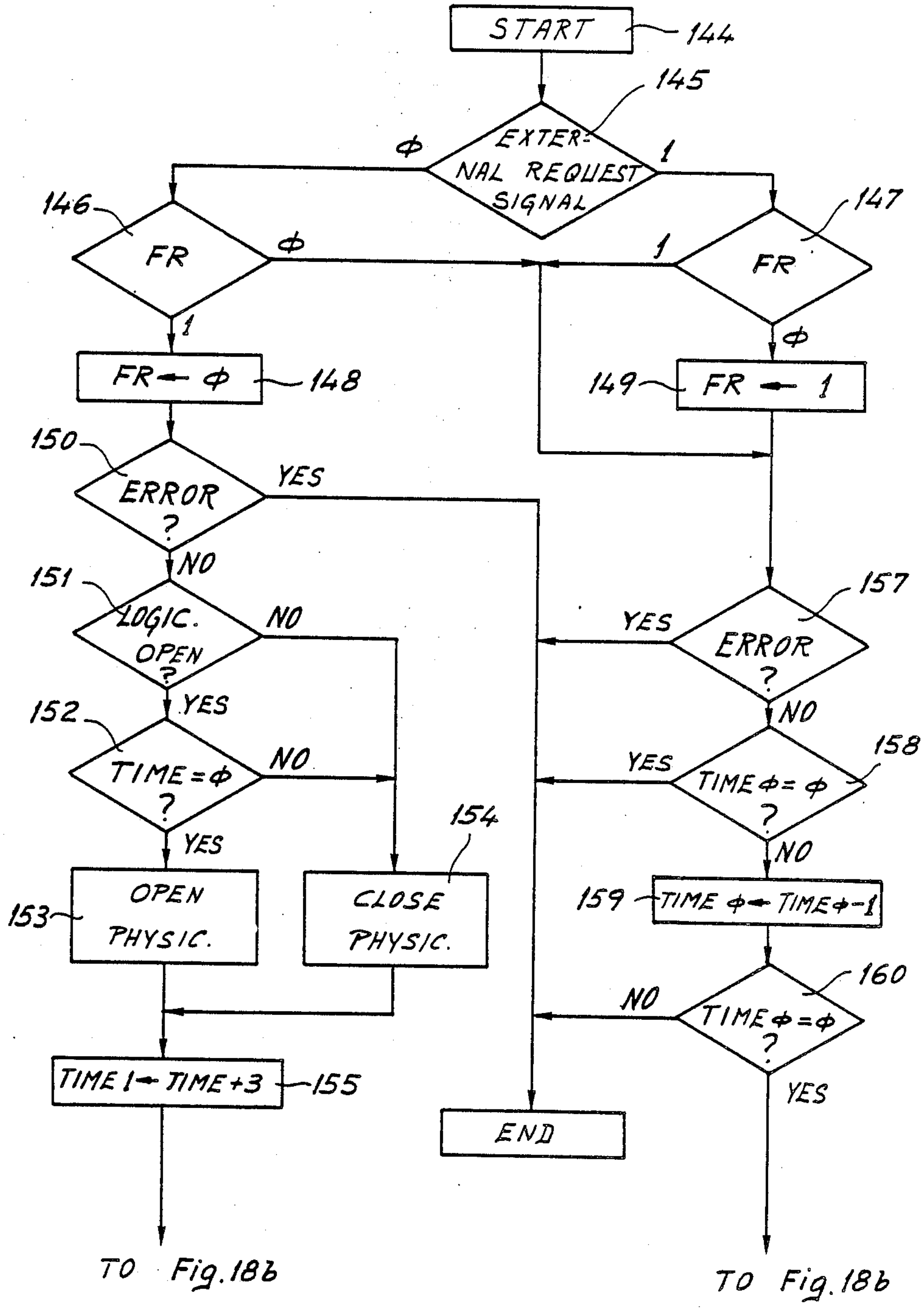
FIGS. 18*a* and 18*b* together show a chart of the timing sub-program.
Figure 18B:
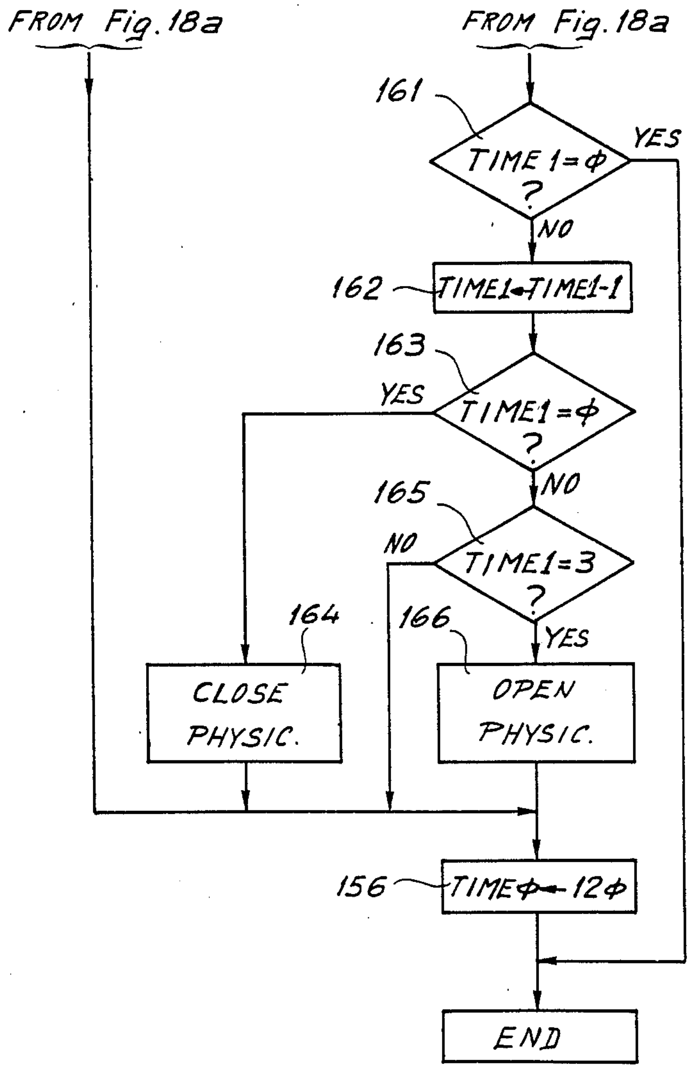

FIGS. 18*a* and 18*b* will now be described which are relative to timing of the opening of sliding block 11. The corresponding algorithm is executed each half second following calculation of the time (FIG. 8*a*).

In the preceding description of the algorithms governing the program of the micro-processor 30, several notions of opening and closing have been employed (removal or placing of bans) which are the following:

1. opening in the sense of the program. This occurs when the real time HRAC is between the limits of an opening time slot of the program;

2. theoretical opening. This is the opening in the sense of the program, which may be restrained by an imposed inhibition. In the theoretical sense, the apparatus is open if the real time is between the limits of an opening time slot and is not between the limits of an imposed inhibition period which may eventually be programmed;

3. logic opening. Outside the theoretical opening time slots the apparatus is logically closed. Within the theoretical time slots the apparatus may be logically opened or logically closed either by manual action or by the play of the chosen inhibitions;

4. physical opening. Corresponds to the state of the sliding block 11 as displaced by the motor. In an arrangement according to the invention without a timing system the physical opening would correspond to the logical opening. However, it is possible to provide a timing arrangement and in this case the logical opening defines the period during which an external request signal for opening is taken into consideration and gives rise, following a programmable waiting period, to a physical opening of a standard duration of three minutes for instance.

The request signal may be presented at any time whatsoever and may be eventually associated with a special code known only to authorized personnel. If the opening is thus requested, the algorithms of FIGS. 18*a* and 18*b* impose a limited duration to the possibility of opening while such opening will occur only after the waiting period mentioned above. The timing algorithm of FIGS. 18*a* and 18*b* consists following start-up at 144 in examining initially a transition of the request signal with the help of tests 145, 146 and 147. These tests consist of examining the state of a flag FR which is established at zero following test 146 (operation 148) or to one (149).

Following operation 148, a test is carried out at 150 to determine if there has been an error. If the test is negative, at 151 there will be examined if there is a logical opening. In the positive case, a test is carried out to examine if the variable TEMP is equal to zero, this variable being the value of the order corresponding to the duration of temporisation which is here three minutes. If the variable TEMP is equal to zero, the motor is operated in the opening sense (operation 153), after which the variable TEMP receives the value 3. If tests 151 and 152 are negative, the motor 20 is operated in the closing sense (operation 154) which likewise returns to the operation 155 for adjustment of the variable TEMP. Then the program continues by updating a variable TEMP0 to its initial value of 120 half-seconds during the operation 156 appearing on FIGS. 18*b*.

Following operation 149, which consists of establishing a 1 for the flag FR, it is determined if there has been an error at 157, followed by a check to determine if the variable TEMP0 is equal to zero. In the negative case, the variable is decreased by one at 159, following which this variable is again compared with zero in test 160.

If this test comes out negative, test 161 checks if the variable TEMP1 is equal to zero. In the negative case, this value is decremented by one (operation 162) following which there is again checked during test 163 whether this variable is equal to zero. In the positive case, motor 20 is operated in the closing sense (operation 164) and the program loops back to operation 156. In the negative a further test at 165 is effected on variable TEMP1 to check if it is equal to 3. In the negative case the program loops back to operation 156. In the positive case, motor 20 is operated in the opening sense (operation 166). Finally, if test 161 is positive the program loops back to the main program.

What we claim is:

1. In combination:

(a) a lock for a safe, strong box or other protected enclosure, said lock comprising:

(i) rod linkage means arranged to be moved between a locking position and an unlocking position, and (ii) key actuated, time independent lock means for opposing the movement of said rod linkage means from said locking position towards said unlocking position;

(b) time dependent lock means for placing and removing a conditional ban upon movement of said rod linkage means, said time dependent means comprising electromechanical blocking means, also associated with said rod linkage means, for opposing the movement thereof from said locking position to said unlocking position; and (c) electronic circuit means connected to said electromechanical blocking means for controlling the latter, said electronic circuit means comprising:

(i) memory means in which is stored a time schedule program to be cyclically executed and defining at least one time slot of ban removal, (ii) means, associated with said memory means, for periodically effecting a comparison of the time of day with time data of said time schedule program, said time data representing moments framing said time slot, and (iii) means for controlling the blocking means, thereby respectively to block or release said electromechanical blocking means when there is equality between the time of day and said moments; and wherein said key-actuated, time independent means is actuatable regardless of whether said blocking means is blocked or released.

2. Combination as set forth in claim 1 wherein said electronic circuit means includes a microprocessor means programmed to give the time of day and to effect said comparison at regular intervals.

3. Combination as set forth in claim 2 wherein each of said framing moments is defined in said memory means by means of a data item comprising digital values of minutes, hours and, where necessary, days and weeks, an information item determining whether said data item appears in the time schedule program or not, and an information item defining in which sense the blocking means are to be controlled thereby either to place or remove the ban on the operation of the lock.

4. Combination as set forth in claim 3 wherein said micro-processor means is programmed so that following, each determination of equality between the time of day and a framing moment of the cyclic time schedule program, it extracts from the memory means the data item corresponding to the following framing moment of said time schedule program and verifies the equality of the new data item and the time of day at the rhythm of said regular intervals.

5. Combination as set forth in claim 4 wherein the data stored in the memory means likewise includes data items defining time intervals during which the removal of the ban, as provided in the cyclic time schedule program, is inhibited.

6. Combination as set forth in claim 5 wherein said microprocessor means is also programmed so as to verify during each comparison operation whether the following framing moment, as provided by the cyclic time schedule program, arrives during an interval corresponding to an inhibition of the ban removal.

7. Combination as set forth in claim 6 wherein said microprocessor means is connected to an interactive communication control system and is programmed to permit subsequent introduction of data defining the inhibition intervals.

8. Combination as set forth in claim 7 wherein said microprocessor means is programmed to admit subsequent introduction of data defining the inhibition intervals only on the presentation of an authorization code.

9. Combination as set forth in claim 1 wherein said cyclic time schedule program is on a weekly cycle.

10. Combination as set forth in claim 1 further comprising means for delaying action on the blocking means during a predetermined time interval following determination of equality between the time of day and a framing moment corresponding to a removal of the ban on the operation of the lock.

11. Combination as set forth in claim 4 wherein said micro-processor means is programmed so as to determine the sense of control of said blocking means towards a ban or the removal of a ban on lock operation as a function of the number of framing moments appearing during a predetermined time interval.

12. Arrangement as set forth in claim 1, further comprising means for permitting a user to place an additional ban within said time slot.

* * * * *